US012568202B2

(12) United States Patent
Xu et al.

(10) Patent No.: US 12,568,202 B2
(45) Date of Patent: Mar. 3, 2026

(54) IBC CHROMA BLOCK VECTOR SEARCH RANGE VALIDATION

(71) Applicant: Tencent America LLC, Palo Alto, CA (US)

(72) Inventors: Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 163 days.

(21) Appl. No.: 18/376,352

(22) Filed: Oct. 3, 2023

(65) Prior Publication Data

US 2024/0214554 A1    Jun. 27, 2024

Related U.S. Application Data

(60) Provisional application No. 63/434,398, filed on Dec. 21, 2022.

(51) Int. Cl.
H04N 19/105 (2014.01)
H04N 19/132 (2014.01)
(Continued)

(52) U.S. Cl.
CPC ......... H04N 19/105 (2014.11); H04N 19/132 (2014.11); H04N 19/176 (2014.11); H04N 19/186 (2014.11); H04N 19/96 (2014.11)

(58) Field of Classification Search
CPC .. H04N 19/105; H04N 19/132; H04N 19/176; H04N 19/186; H04N 19/96; H04N 19/11; H04N 19/593; H04N 19/70
See application file for complete search history.

(56) References Cited

U.S. PATENT DOCUMENTS 10,448,025 B1 * 10/2019 Xu ........................ H04N 19/186
11,375,217 B2 * 6/2022 Xu ........................ H04N 19/146
(Continued)

OTHER PUBLICATIONS

C. Muhammed, et al., Algorithm description of Enhanced Compression Model 7 (ECM 7), Joint Video Experts Team (JVET) of ITU-T SG 16 WP 3 and ISO/IEC JTC 1/SC 29, 28th Meeting, Mainz, DE, Oct. 20-28, 2022, JVET-AB2025, pp. 1-62.
(Continued)

*Primary Examiner* — James M Pontius
(74) *Attorney, Agent, or Firm* — ArentFox Schiff LLP

(57) ABSTRACT

Aspects of the disclosure include methods and apparatuses for video coding. One of the apparatuses includes processing circuitry that receives a bitstream of a current region in a picture. The current region includes a luma coding region and a chroma coding region. The luma coding region and the chroma coding region are partitioned using separate coding tree structures. The processing circuitry determines a chroma block vector (BV) of a current chroma block in the chroma coding region. The chroma BV indicates a chroma reference block in the picture. The processing circuitry determines whether the chroma BV is valid based on whether collocated luma samples of the chroma reference block are within an allowed range of a luma region that includes collocated luma samples of the current chroma block. If the chroma BV is valid, the processing circuitry reconstructs the current chroma block based on the chroma reference block.

20 Claims, 15 Drawing Sheets

(51) Int. Cl.
  *H04N 19/176* (2014.01)
  *H04N 19/186* (2014.01)
  *H04N 19/96* (2014.01)

(56) References Cited

U.S. PATENT DOCUMENTS

| | | | | |
|---|---|---|---|---|
| 12,075,031 | B2 * | 8/2024 | Zhang | H04N 19/105 |
| 12,088,786 | B2 * | 9/2024 | Zhang | H04N 19/105 |
| 12,445,601 | B2 * | 10/2025 | Xu | H04N 19/96 |
| 2019/0246128 | A1 * | 8/2019 | Xu | H04N 19/11 |
| 2022/0086433 | A1 * | 3/2022 | Zhang | H04N 19/70 |
| 2022/0132105 | A1 * | 4/2022 | Xu | H04N 19/157 |
| 2022/0150474 | A1 * | 5/2022 | Xu | H04N 19/176 |
| 2023/0019459 | A1 * | 1/2023 | Xu | H04N 19/176 |
| 2023/0081842 | A1 * | 3/2023 | Wang | H04N 19/70 |
| | | | | 375/240.02 |
| 2025/0071306 | A1 * | 2/2025 | Wang | H04N 19/186 |

OTHER PUBLICATIONS

T. Nguyen, X. Xu, F. Henry, R.-L. Liao, M. Sarwer; M. Karczewicz; Y.-H. Chao, J. Xu, S. Liu, D. Marpe, G. J. Sullivan, "Overview of the Screen Content Support in VVC: Applications, Coding Tools, and Performance," in IEEE Transactions on Circuits and Systems for Video Technology, pp. 1-17.

* cited by examiner (a) horizontal split (b) vertical split

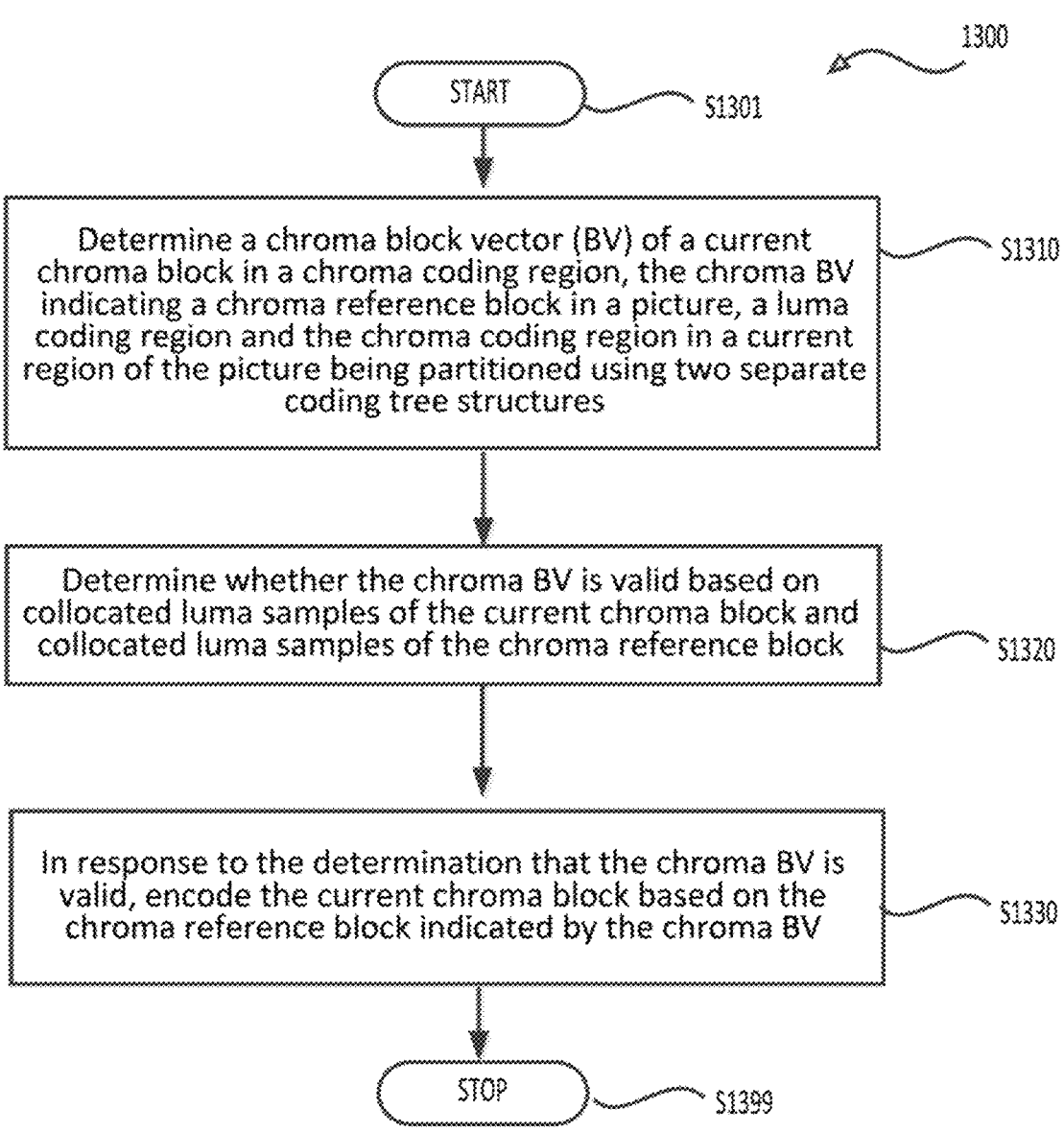

1300

START — S1301

Determine a chroma block vector (BV) of a current chroma block in a chroma coding region, the chroma BV indicating a chroma reference block in a picture, a luma coding region and the chroma coding region in a current region of the picture being partitioned using two separate coding tree structures — S1310

Determine whether the chroma BV is valid based on collocated luma samples of the current chroma block and collocated luma samples of the chroma reference block — S1320

In response to the determination that the chroma BV is valid, encode the current chroma block based on the chroma reference block indicated by the chroma BV — S1330

STOP — S1399

*FIG. 13*

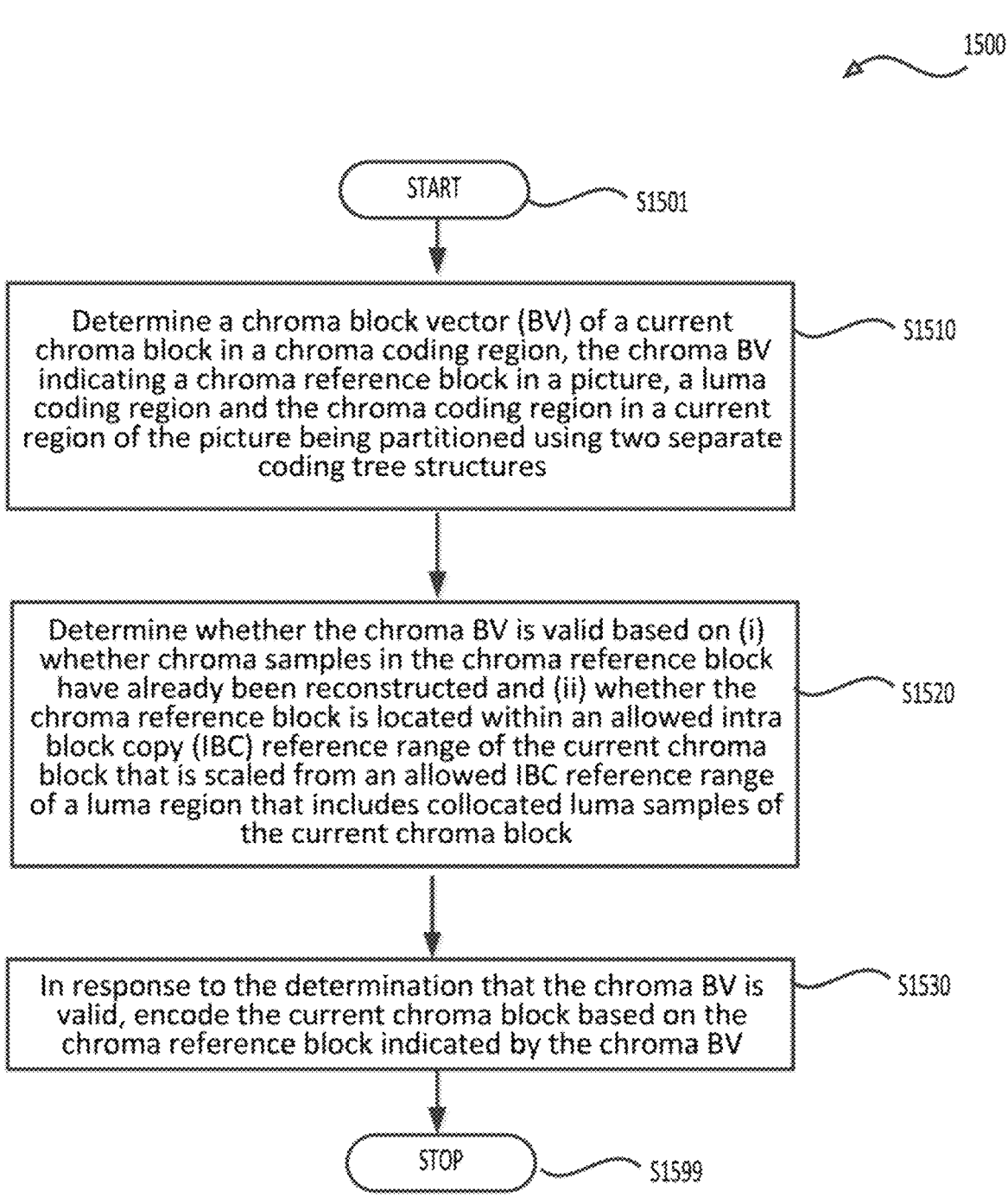

1500

START — S1501

Determine a chroma block vector (BV) of a current chroma block in a chroma coding region, the chroma BV indicating a chroma reference block in a picture, a luma coding region and the chroma coding region in a current region of the picture being partitioned using two separate coding tree structures — S1510

Determine whether the chroma BV is valid based on (i) whether chroma samples in the chroma reference block have already been reconstructed and (ii) whether the chroma reference block is located within an allowed intra block copy (IBC) reference range of the current chroma block that is scaled from an allowed IBC reference range of a luma region that includes collocated luma samples of the current chroma block — S1520

In response to the determination that the chroma BV is valid, encode the current chroma block based on the chroma reference block indicated by the chroma BV — S1530

STOP — S1599

*FIG. 15*

IBC CHROMA BLOCK VECTOR SEARCH RANGE VALIDATION

INCORPORATION BY REFERENCE

The present application claims the benefit of priority to U.S. Provisional Application No. 63/434,398, "IBC CHROMA BLOCK VECTOR SEARCH RANGE VALIDATION" filed on Dec. 21, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives a bitstream of a current region in a picture. The current region includes a luma coding region and a chroma coding region. Coding information in the bitstream indicates that the luma coding region and the chroma coding region are partitioned using separate coding tree structures. The processing circuitry determines a chroma block vector (BV) of a current chroma block in the chroma coding region. The chroma BV indicates a chroma reference block in the picture. The processing circuitry determines whether the chroma BV is valid based on collocated luma samples of the current chroma block and collocated luma samples of the chroma reference block. In response to the determination that the chroma BV is valid, the processing circuitry reconstructs the current chroma block based on the chroma reference block indicated by the chroma BV. In an example, the processing circuitry determines whether the chroma BV is valid based on whether collocated luma samples of the chroma reference block are within an allowed range of a luma region that includes collocated luma samples of the current chroma block.

In an embodiment, the current chroma block is predicted under one of: (i) an intra block copy (IBC) mode, (ii) an intra template matching prediction (IntraTMP) mode, and (iii) a direct block vector (DBV) mode.

In an embodiment, the processing circuitry determines that the chroma BV is valid in response to (i) the collocated luma samples of the chroma reference block being located within an allowed IBC reference range of a luma region that includes the collocated luma samples of the current chroma block and (ii) chroma samples in the chroma reference block having already been reconstructed. The allowed range can be the allowed IBC reference range.

In an example, in response to the determination that the chroma BV is not valid, the processing circuitry corrects the chroma BV to obtain a valid chroma BV and reconstructs the current chroma block based on another chroma reference block indicated by the valid chroma BV. (i) Collocated luma samples of the other chroma reference block are located within the allowed IBC reference range of the luma region and (ii) chroma samples in the other chroma reference block have already been reconstructed.

In an example, the processing circuitry (i) decodes the chroma BV explicitly from the coding information; or (ii) derives the chroma BV using the IntraTMP mode or the DBV mode.

In an example, the current region is a current coding tree unit (CTU), the luma coding region is a luma coding tree block (CTB) in the current CTU, and the chroma coding region is a chroma CTB in the current CTU.

In an example, a current CTU in the picture is split into four coding units using a quad-tree split, and the current region is a coding unit of the four coding units.

In an example, the allowed IBC reference range comprises at least one of reconstructed luma samples in a current coding tree unit (CTU) or one or more previously reconstructed CTUs, the current CTU including the current region.

In an example, the coding information in the bitstream comprises a flag indicating that the luma coding region and the chroma coding region are partitioned using two separate coding tree structures.

In an embodiment, the processing circuitry can determine whether the chroma BV is valid based on (i) whether chroma samples in the chroma reference block have already been reconstructed and (ii) whether the chroma reference block is located within an allowed intra block copy (IBC) reference range of the current chroma block that is scaled from an allowed IBC reference range of a luma region that includes collocated luma samples of the current chroma block. In response to the determination that the chroma BV is valid, the processing circuitry reconstructs the current chroma block based on the chroma reference block indicated by the chroma BV.

In an embodiment, the processing circuitry scales the allowed IBC reference range of the luma region including the collocated luma samples of the current chroma block to determine the allowed IBC reference range of the current chroma block.

In an embodiment, scaling factors between the allowed IBC reference range of the current chroma block and the allowed IBC reference range of the luma region depend on a chroma sampling format.

In an example, the scaling factors between the allowed IBC reference range of the current chroma block and the allowed IBC reference range of the luma region are different for different dimensions.

In an example, the scaling factors include a horizontal scaling factor and a vertical scaling factor. In response to the chroma sampling format being 4:2:0, the horizontal scaling factor and the vertical scaling factor are 2 and 2, respectively. In response to the chroma sampling format being 4:2:2, the horizontal scaling factor and the vertical scaling factor are 2 and 1, respectively. In response to the chroma sampling format being 4:4:4, the horizontal scaling factor and the vertical scaling factor are 1 and 1, respectively.

In an embodiment, the processing circuitry determines that the chroma BV is valid in response to (i) the chroma samples in the chroma reference block having already been reconstructed and (ii) the chroma reference block being located within the allowed IBC reference range of the current chroma block.

In an example, in response to the determination that the chroma BV is not valid, the processing circuitry corrects the chroma BV to obtain a valid chroma BV and reconstructs the current chroma block based on another chroma reference block indicated by the valid chroma BV. (i) The chroma samples in the chroma reference block have already been reconstructed and (ii) the other chroma reference block is located within the allowed IBC reference range of the current chroma block.

Aspects of the disclosure also provide a non-transitory computer-readable medium storing instructions which when executed by a computer cause the computer to perform the method for video encoding/decoding.

BRIEF DESCRIPTION OF THE DRAWINGS

Further features, the nature, and various advantages of the disclosed subject matter will be more apparent from the following detailed description and the accompanying drawings in which:

FIG. 13 shows a flow chart outlining an encoding process according to some embodiments of the disclosure.

FIG. 15 shows a flow chart outlining an encoding process according to some embodiments of the disclosure.

DETAILED DESCRIPTION OF EMBODIMENTS

Figure 1:
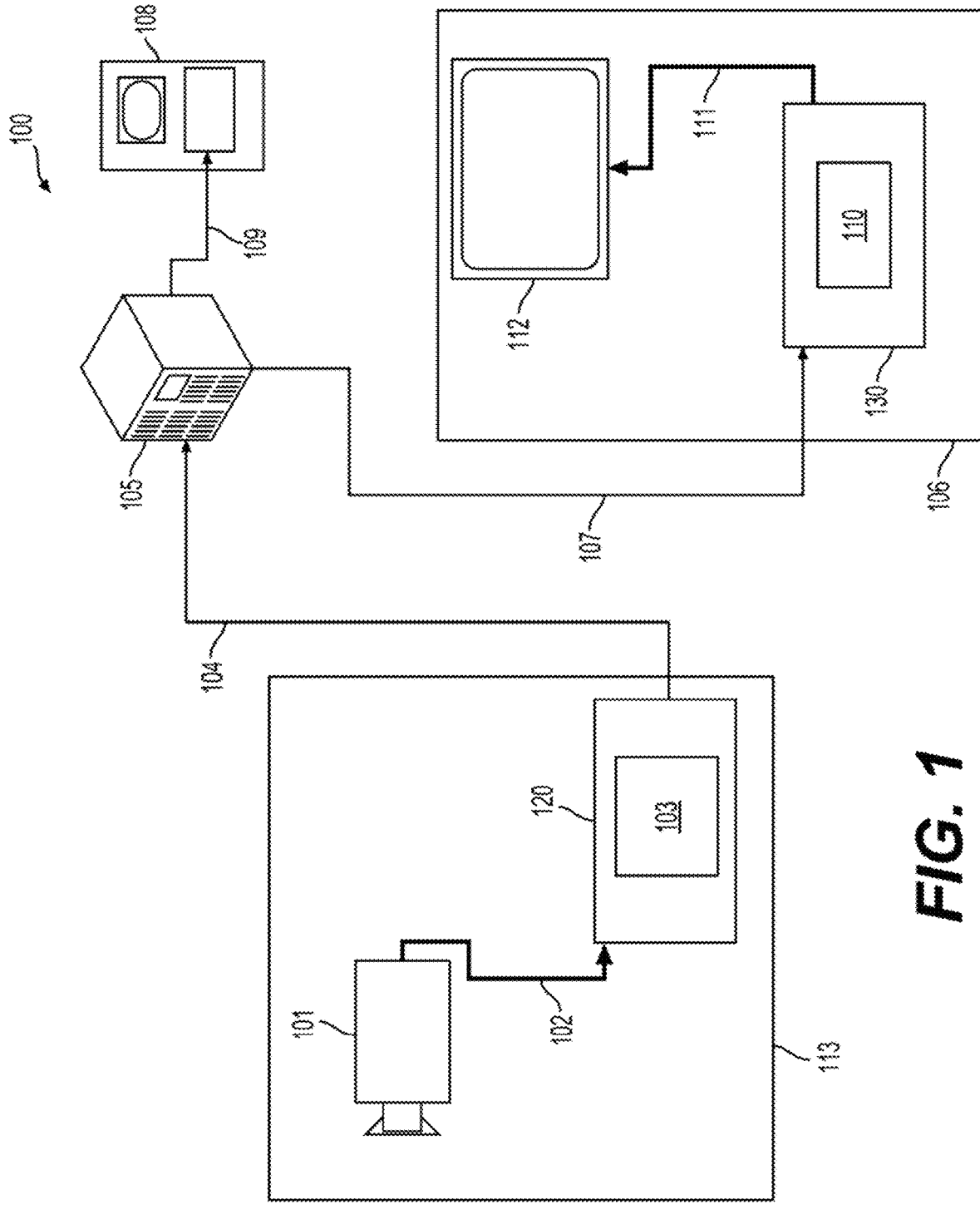
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
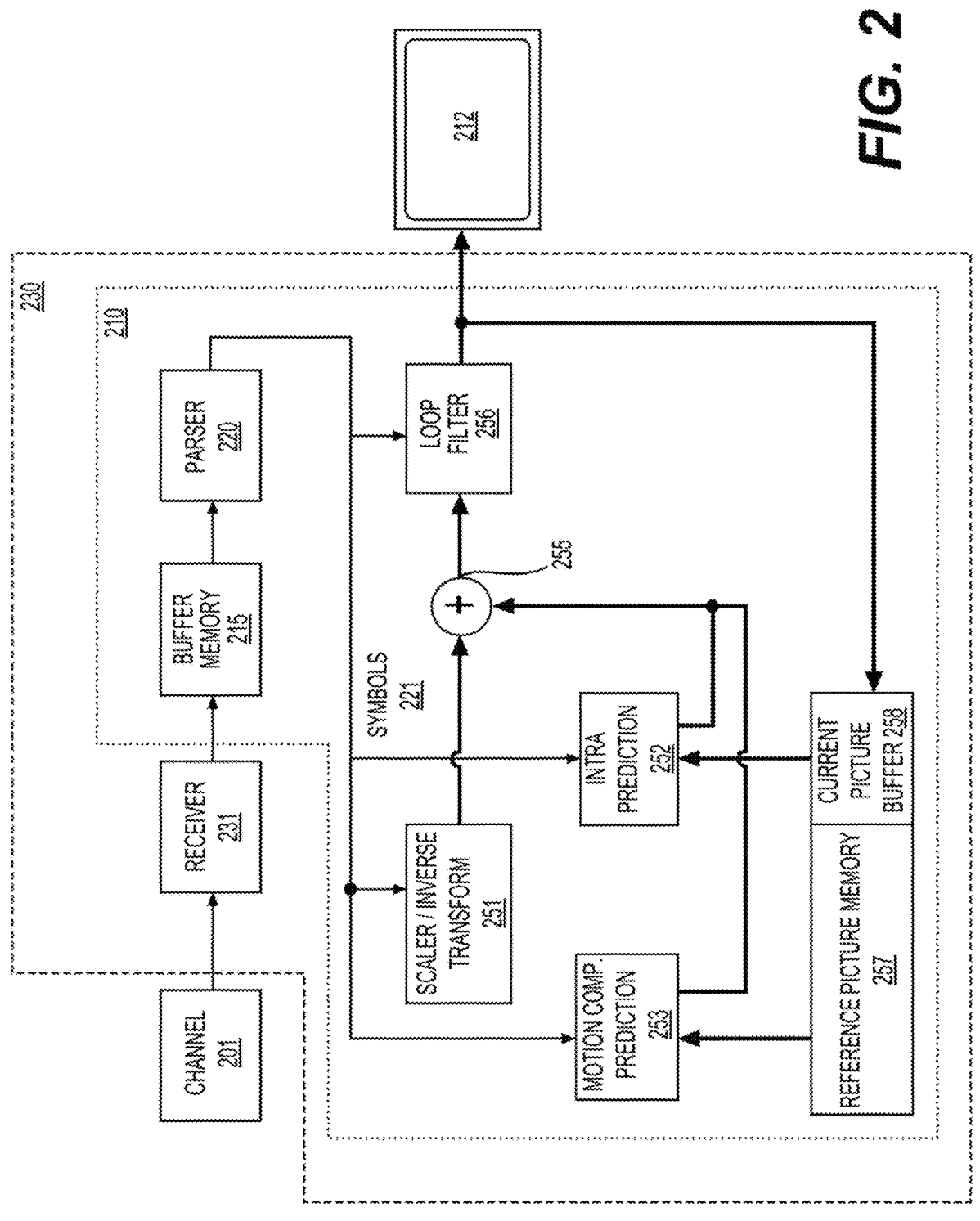
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
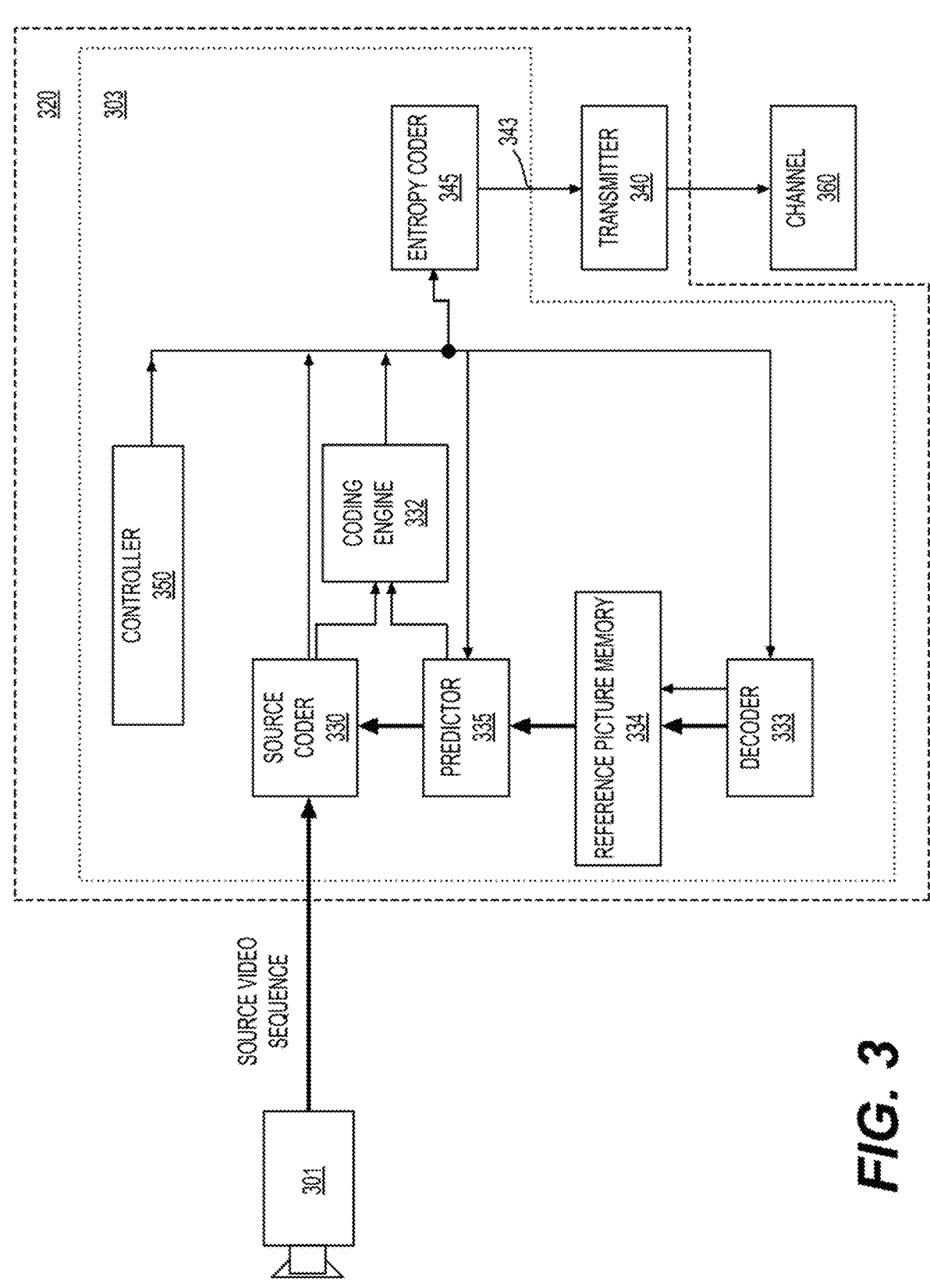
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340)

may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and a reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Examples of an intra block copy mode (also referred to as an IntraBC mode or an IBC mode), such as used in HEVC and VVC, are described below.

Some IBC coding tools are used in the HEVC Screen Content Coding (SCC) extensions as current picture referencing (CPR). The IBC mode can use coding technologies that are used for inter prediction where a current picture (also referred to as a current frame) is used as a reference picture (also referred to as a reference frame) in the IBC mode. A benefit of using the IBC mode is a referencing structure of the IBC mode where a two-dimensional (2D) spatial vector can be used as the representation of an addressing mechanism to reference samples. A benefit of an architecture of the IBC mode is that the integration of IBC requires relatively minor changes to the specification and can ease the implementation burden if manufacturers have already implemented certain prediction technologies, such as the HEVC version 1. CPR in the HEVC SCC extensions can be a special inter prediction mode, resulting in a same syntax structure or a similar syntax structure as the syntax structure of the inter prediction mode and a decoding process that is similar to a decoding process of the inter prediction mode.

The IBC mode can be integrated into the inter prediction process. In some examples, the IBC mode (or CPR) is an inter prediction mode, and an intra-only predicted slice is to become a predicted slice to allow the usage of the IBC mode. When the IBC mode is applicable, a coder can extend a reference picture list by one entry for a pointer to point to the current picture. For example, the current picture uses a one picture-sized buffer of a shared decoded picture buffer (DPB). The IBC mode signaling can be implicit. For example, when the selected reference picture points to the current picture, a CU can employ the IBC mode. In various embodiments, reference samples used in the IBC process are not filtered, which is different from a regular inter prediction. The corresponding reference picture used in the IBC process is a long-term reference. To minimize the memory requirement, the coder can release the buffer after reconstructing the current picture, for example, the coder immediately releases the buffer after reconstructing the current picture. A filtered version of the reconstructed picture can be put back into the DPB by the coder as a short-term reference when the reconstructed picture is a reference picture.

In block vector (BV) coding, referencing to a reconstructed area can be performed via a 2D BV which is similar to an MV used in the inter prediction. Prediction and coding of a BV can reuse MV prediction and coding in the inter prediction process. In some examples, a luma BV is in an integer resolution rather than a ¼-th (or ¼-pel) precision of a MV as used for a regular inter coded CTU.

Figure 4:
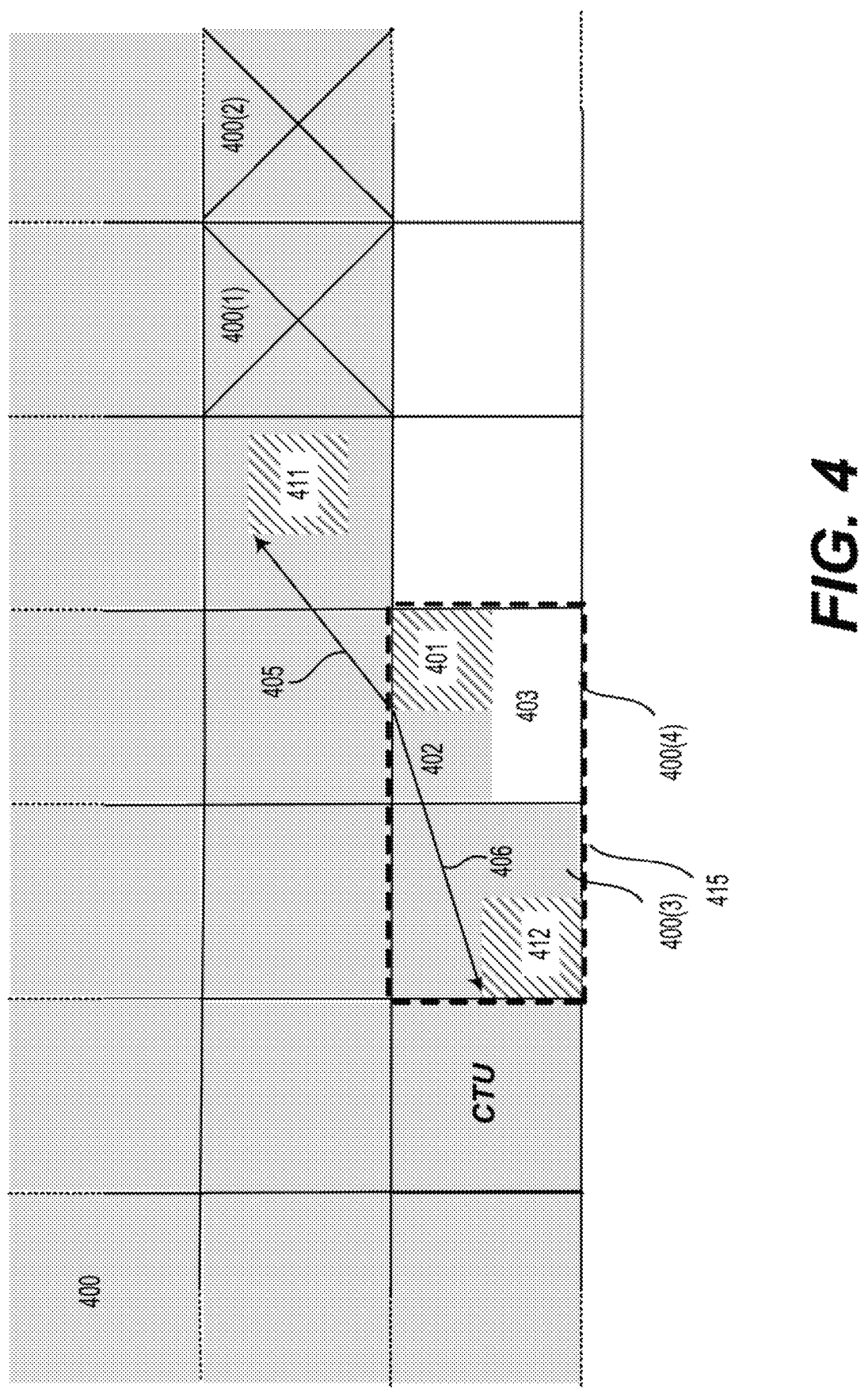
FIG. 4 shows BVs associated with a current CU (401) according to some embodiments of the disclosure.

FIG. 4 shows BVs associated with a current CU (401) according to embodiments of the disclosure. Each square (400) can represent a CTU. A gray-shaded area represents an already coded area or an already coded region, and a white, non-shaded area represents an area or a region to be coded. A current CTU (400(4)) that is under reconstruction includes the current CU (401), a coded area (402), and an area (403) to be coded. In an example, the area (403) will be coded after coding the current CU (401).

In an example, such as in HEVC, the gray-shaded area except for the two CTUs (400(1)-400(2)) that are on the right above the current CTU (400(4)) can be used as a reference area in the IBC mode to allow a Wavefront Parallel Processing (WPP). A BV that is allowed in HEVC can point to a block that is within the reference area (e.g., the gray-shaded area excluding the two CTUs (400(1)-400(2))). For example, a BV (405) that is allowed in HEVC points to a reference block (411).

In an example, such as in VVC, in addition to the current CTU (400(4)), only a left neighboring CTU (400(3)) to the left of the current CTU (400(4)) is allowed as a reference area in the IBC mode. In an example, the reference area used in the IBC mode in VVC is within a dotted area (415) and includes samples that are coded. For example, a BV (406) that is allowed in VVC points to a reference block (412). In an example, a decoded motion vector difference (MVD) or block vector difference (BVD) of a BV is left-shifted (e.g., by two) before being added to a BV predictor to determine the final BV.

The IBC mode can be different from the inter prediction mode, and thus special handling may be used for implementation and performance reasons such as described below. In an embodiment, IBC reference samples are unfiltered, e.g., the reconstructed samples before in-loop filtering processes, including but not limited to a deblocking filter (DBF) and sample adaptive offset (SAO) filter, are used as reference samples in the IBC mode where other inter prediction modes, such as used in HEVC, employ filtered samples as reference samples. In an embodiment, there is no luma sample interpolation for the IBC mode. In an embodiment, chroma sample interpolation is used when a chroma BV is a non-integer when the chroma BV is derived from a luma BV. In an embodiment, the chroma BV is a non-integer, and a reference block is near the boundary of an available region. For example, surrounding reconstructed samples are outside of the boundary to perform the chroma sample interpolation. BVs pointing to a single next-to-border line may not be possible to avoid such cases.

An exemplary IBC architecture, such as used in VVC, can be described as below. An effective reference area for the IBC mode, such as used in the HEVC SCC extensions, can include almost a whole already reconstructed area of a current picture, with some exceptions for parallel processing purposes, such as described in FIG. 4. FIG. 4 illustrates the reference area for the IBC mode in HEVC and the configuration in VVC. For example, referring to FIG. 4, only the CTU (400(3)) to the left of the current CTU (400(4)) can serve as the reference sample area at the beginning of the reconstruction process of the current CTU (400(4)). In some examples, a drawback of the concept in HEVC is the requirement for additional memory in the DPB, for which hardware implementations employ external memory. In an example, the additional access to external memory results in an increased memory bandwidth, making using the DPB less attractive. In some embodiments, the IBC mode, such as in VVC, can use a fixed memory that can be realized on-chip, and thus significantly decreasing the complexity of implementing the IBC mode in hardware architectures. In an embodiment, a significant modification addresses the signaling concept departed from the integration within the inter prediction process such as in the HEVC SCC extensions.

Figure 5:
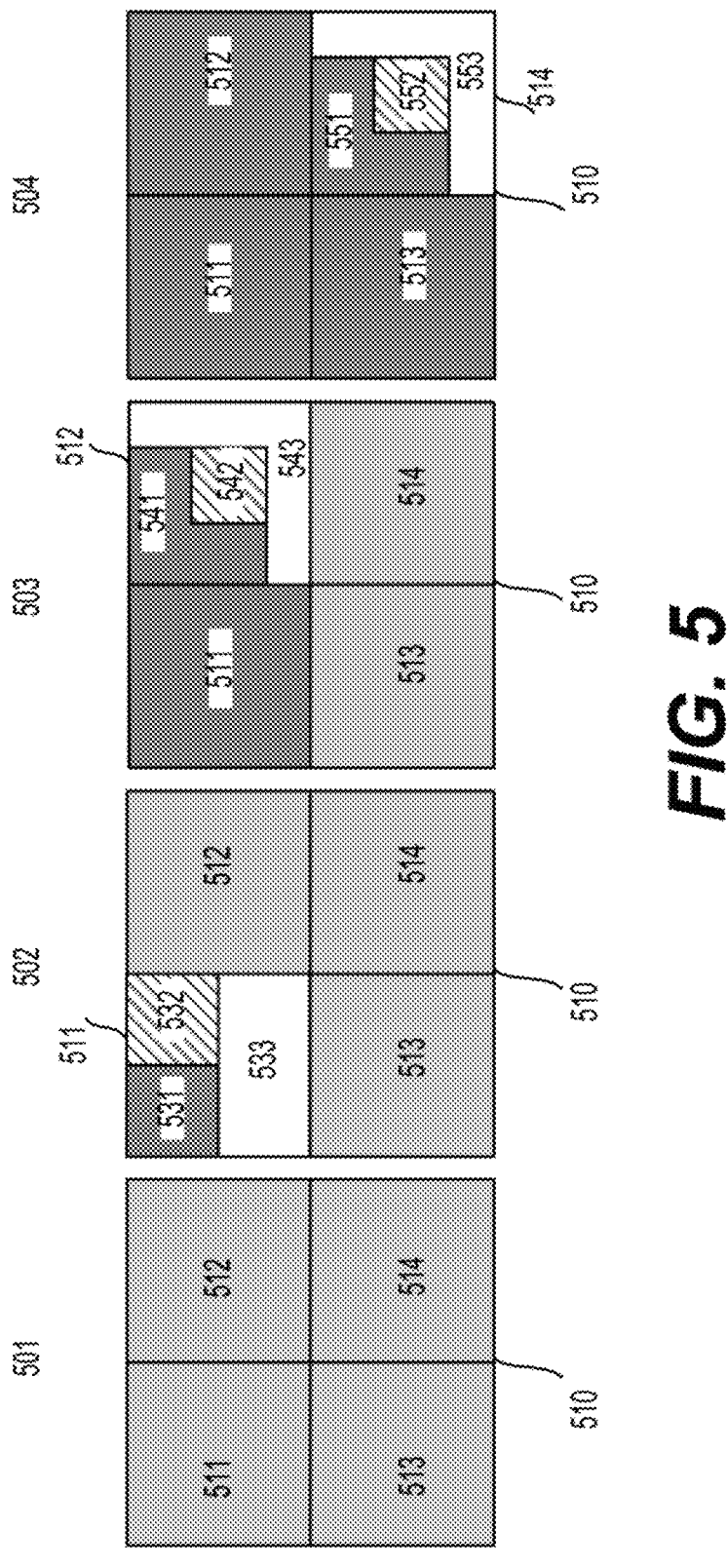
FIG. 5 shows a reference sample memory (RSM) update process at four intermediate times during a reconstruction process according to an embodiment of the disclosure.

FIG. 5 shows a reference sample memory (RSM) (510) update process at four intermediate times (501)-(504) during a reconstruction process according to an embodiment of the disclosure. A light-gray shaded area can represent reference samples of a left neighboring CTU. A dark-gray shaded area can represent reference samples of a current CTU. A white and unshaded area can represent a region to be coded (e.g., upcoming coding areas).

Examples of syntax and semantics of the IBC mode such as used in VVC can be described as below. The IBC architecture such as used in VVC can form a dedicated coding mode where the IBC mode is the third prediction mode in addition to the intra prediction mode and the inter prediction mode. A bitstream can carry an IBC syntax element (e.g., an sIBC syntax element) indicating the IBC mode for a coding unit, for example, when a block size is 64×64 or less. In an embodiment, the largest CU size that can utilize the IBC mode is 64×64 to realize the continuous memory update mechanism of the RSM. The reference sample addressing mechanism can be the same as used in the HEVC SCC extensions by denoting a two-dimensional offset and reusing the vector coding processes of the inter prediction mode. In an example, the chroma separate tree (CST) is active, and the coder cannot derive chroma BVs from luma BVs, resulting in the usage of the IBC mode for luma coding blocks only.

A reference area and sample memory in the IBC mode such as used in VVC can be described below. The IBC design such as used in VVC can employ a fixed memory size (e.g., 128×128) for each color component to store reference samples, thus enabling the possibility for an on-chip placement in hardware implementations. In an example, the maximum CTU size in VVC is 128×128. In an embodiment, the RSM can store samples of a single CTU when the maximum CTU size configuration is equal to 128×128. In an example, a feature of the RSM includes a continuous update mechanism that can replace reconstructed samples of a left neighboring CTU with reconstructed samples of a current CTU.

FIG. 5 shows a RSM example (e.g., a simplified RSM example) for the update mechanism at the four intermediate times (501)-(504) during the reconstruction process. Referring to FIG. 5, at the first intermediate time (501) that represents the beginning of the current CTU reconstruction, in an example, the RSM (510) includes the reference samples of the left neighboring CTU only. In the other three intermediate times (502)-(504), the reconstruction process has replaced samples of the left neighboring CTU with the current CTU's variants. An implicit division of the RSM (510) can be applied and the RSM (510) can be divided into four disjoint 64×64 areas (511)-(514). A reset of an area can occur when the coder processes the first coding unit that would lie in the corresponding area when mapping the RSM to the CTU, easing the hardware implementation efforts.

In examples shown in FIG. 5, a fixed memory (e.g., the RSM (510)) can be allocated to store a reference area used in the IBC mode. A portion of the RSM can be updated at different intermediate times (e.g., (501)-(504)) during a coding process (e.g., an encoding process or a reconstruction process). FIG. 5 shows reference areas for the IBC mode in VVC and configurations in VVC.

Referring to FIG. 5, the RSM (510) can include a portion of the current CTU and/or a portion of the left neighboring CTU. In the examples shown in FIG. 5, a size of the RSM is equal to a size of the CTU. The RSM (510) can include portions (511)-(514).

At the first intermediate time (501) of the coding process that is a beginning of the coding process of the current CTU, the RSM (510) includes the entire left neighboring CTU, and the entire left neighboring CTU can serve as the reference area in the IBC mode at the beginning of the coding process of the current CTU. The RSM (510) at the beginning of the coding process of the current CTU does not include the current CTU, and the portions (511)-(514) include the reconstructed samples of the left neighboring CTU.

At the second intermediate time (502) of the coding process of the current CTU, a sub-area (531) of a top-left region in the current CTU is already coded (e.g., encoded or reconstructed), a sub-area (532) of the top-left region in the current CTU is a current CU that is being coded (e.g., being encoded or under reconstruction), and a sub-area (533) of the top-left region in the current CTU is to be coded subsequently. The RSM (510) is updated to include a portion of the left neighboring CTU and a portion of the current CTU. For example, the portions (512)-(514) in the RSM (510) store the same reconstructed samples in the left neighboring CTU as the first intermediate time (501) while the portion (511) is updated to store the sub-area (531) of the current CTU. The reference area at the second intermediate time (502) can include the reconstructed samples of the left neighboring CTU stored in the portions (512)-(514) and the reconstructed samples of the sub-area (531) of the current CTU stored in the portion (511).

At the third intermediate time (503) of the coding process of the current CTU, the top-left region of the current CTU is already reconstructed. A top-right region of the current CTU includes sub-areas (541)-(543). The sub-area (541) (in dark-gray shading) is already coded (e.g., encoded or reconstructed), the sub-area (542) is a current CU that is being coded (e.g., being encoded or under reconstruction), and the sub-area (543) (in white color and unshaded) is to be coded subsequently. The portions (513)-(514) in the RSM (510) store the same reconstructed samples in the left neighboring CTU as the first intermediate time (501) while the portions (511)-(512) are updated such that the portion (511) store the reconstructed samples of the top-left region of the current CTU and the portion (512) stores the sub-area (541) of the current CTU. The reference area at the third intermediate time (503) can include (i) the reconstructed samples of the left neighboring CTU stored in the portions (513)-(514) and (ii) the reconstructed samples of the top-left region of the current CTU stored in the portion (511) and the sub-area (541) of the current CTU stored in the portion (512).

At the fourth intermediate time (504) of the coding process of the current CTU, the top-left region, the top-right region, and a bottom-left region of the current CTU are already reconstructed. A bottom-right region of the current CTU includes sub-areas (551)-(553). The sub-area (551) (in dark-gray shading) is already coded (e.g., encoded or reconstructed), the sub-area (552) is a current CU that is being coded (e.g., being encoded or under reconstruction), and the sub-area (553) (in white color and unshaded) is to be coded subsequently. The portion (511) stores the same reconstructed samples of the top-left region in the current CTU as the third intermediate time (503) while the portions (512)-(514) are updated such that the portions (512)-(513) store the reconstructed samples of the top-right region and the bottom-left region of the current CTU, respectively and the portion (514) stores the sub-area (551) of the current CTU. The reference area at the fourth intermediate time (504) can include the reconstructed samples of the current CTU stored in the portions (511)-(514). The RSM (510) at the fourth intermediate time (504) includes no areas in the left neighboring CTU.

Figure 6:
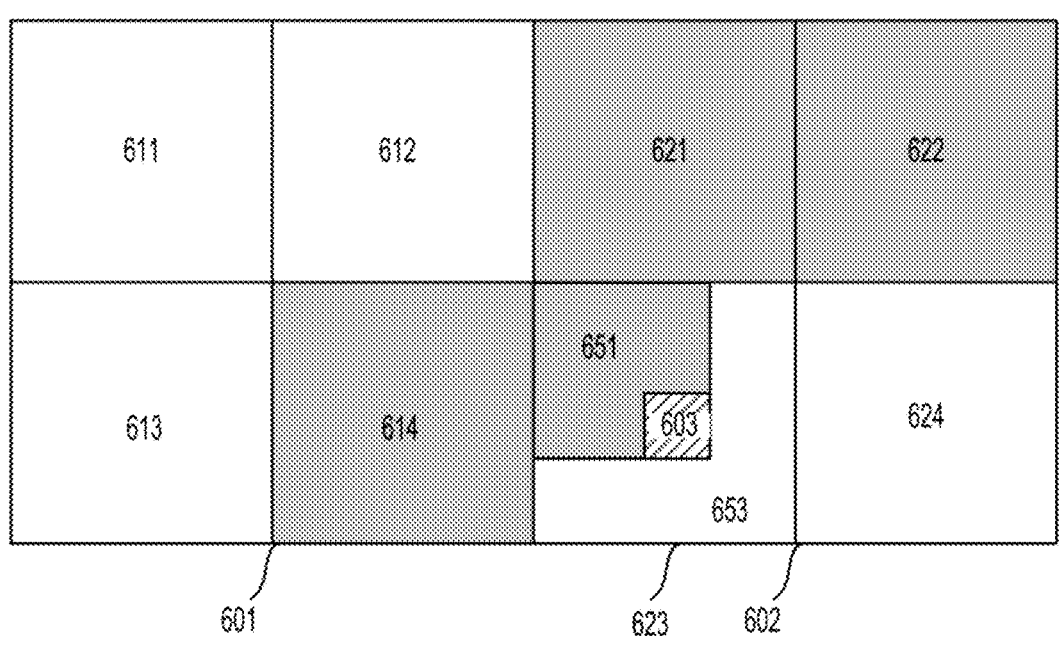
FIG. 6 illustrates a left neighboring CTU and a current CTU denoting an effective reference area according to an embodiment of the disclosure.

FIG. 6 illustrates a left neighboring CTU (601) and a current CTU (602) denoting an effective reference area because of the RSM design and a continuous update mechanism. The left neighboring CTU (601) can include areas (611)-(614). The current CTU (602) can include areas (621)-(624). The area (623) in the current CTU (602) includes a current CU (603) that is being coded, a sub-area (651) that is already coded, and a sub-area (653) that is to be coded. Gray shaded areas can include samples stored in the RSM, and white and unshaded areas can include replaced samples or unreconstructed samples.

FIG. 6 illustrates an example of the continuous update concept of the RSM spatially. At the reconstruction time in the example shown in FIG. 6, the RSM update process has replaced the samples covered by the white and unshaded areas (611)-(613) in the left neighboring CTU (601) with the gray-shaded areas (e.g., the areas (621)-(622) and the sub-area (651)) of the current CTU (602). In FIG. 6, the RSM can include (i) the area (614) in the left neighboring CTU (601) and (ii) the areas (621)-(622) and the sub-area (651) of the current CTU (602).

The RSM may include more than a single left neighboring CTU, for example, when the maximum CTU size is less than the RSM size (e.g., 128×128), and multiple left neighboring CTUs can be used as the reference area in the IBC mode. For example, when the maximum CTU size is equal to 32×32, the RSM having a size of 128×128 may store samples of 15 left neighboring CTUs.

An example block vector (BV) coding of the IBC mode, such as used in VVC, is described below. The BV coding can employ the processes specified for inter prediction. The BV coding of the IBC mode can use more simplistic rules for candidate list construction. For example, the candidate list construction for inter prediction may include five spatial candidates, one temporal candidate, and six history-based candidates. In inter prediction, multiple candidate comparisons are used for history-based candidates to avoid duplicate entries in the final candidate list. Additionally, in inter prediction, the candidate list construction may include pairwise averaged candidates. In an embodiment, the IBC list construction process considers two spatial neighbors' BVs and five history-based BVs (HBVP) only, where only the first HBVP is compared with spatial candidates when added to the candidate list. While the regular inter prediction can use two different candidate lists, one for the merge mode and the other for the regular mode, the candidate list in the IBC mode is for both cases. In the IBC mode, the merge mode may use up to six candidates of the candidate list, and the regular mode uses only the first two candidates of the candidate list. The block vector difference (BVD) coding in the IBC mode can employ the motion vector difference (MVD) process used in inter prediction, resulting in a final BV of any suitable magnitude. In an embodiment, the reconstructed BV may point to an area outside of the reference sample area, and thus a correction is performed to the reconstructed BV, for example, by removing an absolute offset for each direction (e.g., each of the horizontal direction and the vertical direction) using a modulo operation with the width and the height of the RSM.

A derivation process for chroma BVs can include the following. When a current coding tree type is SINGLE_TREE, a chroma block corresponds to a luma block. A BV of the chroma block coded with the IBC mode can be derived from a BV of the luma block, with proper scaling considering a chroma sampling format (e.g., 4:2:0, 4:2:2) and a chroma BV precision. The derivation process can be described below. An input to the process can include a luma BV in $\frac{1}{16}$ fractional-sample accuracy bvL. An output of the process can include a chroma BV in $\frac{1}{32}$ fractional-sample accuracy bvC. The chroma BV can be derived from the corresponding luma BV. The chroma BV bvC can be derived as follows:

$$bvC[0] = ((bvL[0] >> (3 + SubWidthC)) * 32 \qquad \text{Eq. (1)}$$

$$bvC[1] = ((bvL[1] >> (3 + SubHeightC)) * 32 \qquad \text{Eq. (2)}$$

The variables SubWidthC and SubHeightC can be specified in Table 1, depending on the chroma format sampling structure, which can be specified through sps_chroma_format_idc.

TABLE 1

SubWidthC and SubHeightC values derived from sps_chroma_format_idc

| sps_chroma_format_idc | Chroma format | SubWidthC | SubHeightC |
|---|---|---|---|
| 0 | Monochrome | 1 | 1 |
| 1 | 4:2:0 | 2 | 2 |

TABLE 1-continued

| SubWidthC and SubHeightC values derived from sps_chroma_format_idc | | | |
| --- | --- | --- | --- |
| sps_chroma_format_idc | Chroma format | SubWidthC | SubHeightC |
| 2 | 4:2:2 | 2 | 1 |
| 3 | 4:4:4 | 1 | 1 |

In the monochrome sampling (e.g., the chroma format being Monchrome), there is only one sample array, which is nominally considered the luma array.

In the 4:2:0 sampling, each of the two chroma arrays can have half the height and half the width of the luma array.

In the 4:2:2 sampling, each of the two chroma arrays can have the same height and half the width of the luma array.

In the 4:4:4 sampling, each of the two chroma arrays can have the same height and width as the luma array.

The number of bits necessary for the representation of each of the samples in the luma and chroma arrays in a video sequence can be in the range of 8 to 16, inclusive.

An IntraBC mode such as used in AV1 is described below. In an embodiment, such as in AV1, the Intra Block Copy (IntraBC) mode can use a vector to locate a prediction block in the same picture of a current block. The vector is referred to as a block vector (BV). The BV can be signaled in a bitstream and the precision to represent the BV can be integer-point. The prediction process in the IntraBC mode is similar to inter-picture prediction. A difference between the IntraBC mode and the inter prediction is that, in the IntraBC mode, a predictor block can be formed from reconstructed samples of the current picture before applying the loop filtering. Therefore, the IntraBC mode can be considered as "motion compensation" within the current picture using the BV as an MV.

For the current block, a flag used to indicate whether the IntraBC mode is enabled or not for the current block can be first transmitted in a bitstream. Then, if the current block is coded with the IntraBC mode, a BV difference can be derived by subtracting the predicted BV from the current BV. The BV difference can be classified into a plurality of types (e.g., four types) according to a horizontal component and a vertical component of the BV difference value. The type information can be signaled into the bitstream, and the BV difference value of the two (horizontal and vertical) components can be signaled afterwards.

The IntraBC mode can be exceptionally effective for coding certain contents, such as a screen content. In an example, the IntraBC mode also introduces challenges to hardware design. To facilitate the hardware design, the following modifications can be adopted. When the IntraBC mode is allowed, the loop filters are disabled. The loop filters can include a DBF, a constrained directional enhancement filter (CDEF), a loop restoration (LR) filter, and/or the like. By disabling the loop filters, a second picture buffer dedicated for enabling the IntraBC mode can be avoided.

To facilitate parallel decoding, the prediction cannot exceed the restricted areas. In an embodiment, for one superblock or a CTU, if the coordinate of a top-left position of the superblock (or the CTU) is (x0, y0), the prediction at a position (x, y) can be accessed by the IntraBC mode only if the vertical coordinate is less than y0 and the horizontal coordinate is less x0+2(y0−y).

To allow hardware writing back delay, immediate reconstructed areas cannot be accessed by IntraBC prediction. The restricted immediate reconstructed area can be 1 to n super blocks (or CTUs). Thus, in addition to the modification described above, if the coordinate of the top-left position of the superblock (or the CTU) is (x0, y0), the prediction at the position (x, y) can be accessed by the IntraBC mode, if the vertical coordinate is less than y0 and the horizontal coordinate is less than x0+2(y0−y)−D, where D denotes the immediate reconstructed area that is restricted for the IntraBC mode. When D is two superblock such as specified in AVM, the prediction area is shown in FIG. 7.

Figure 7:
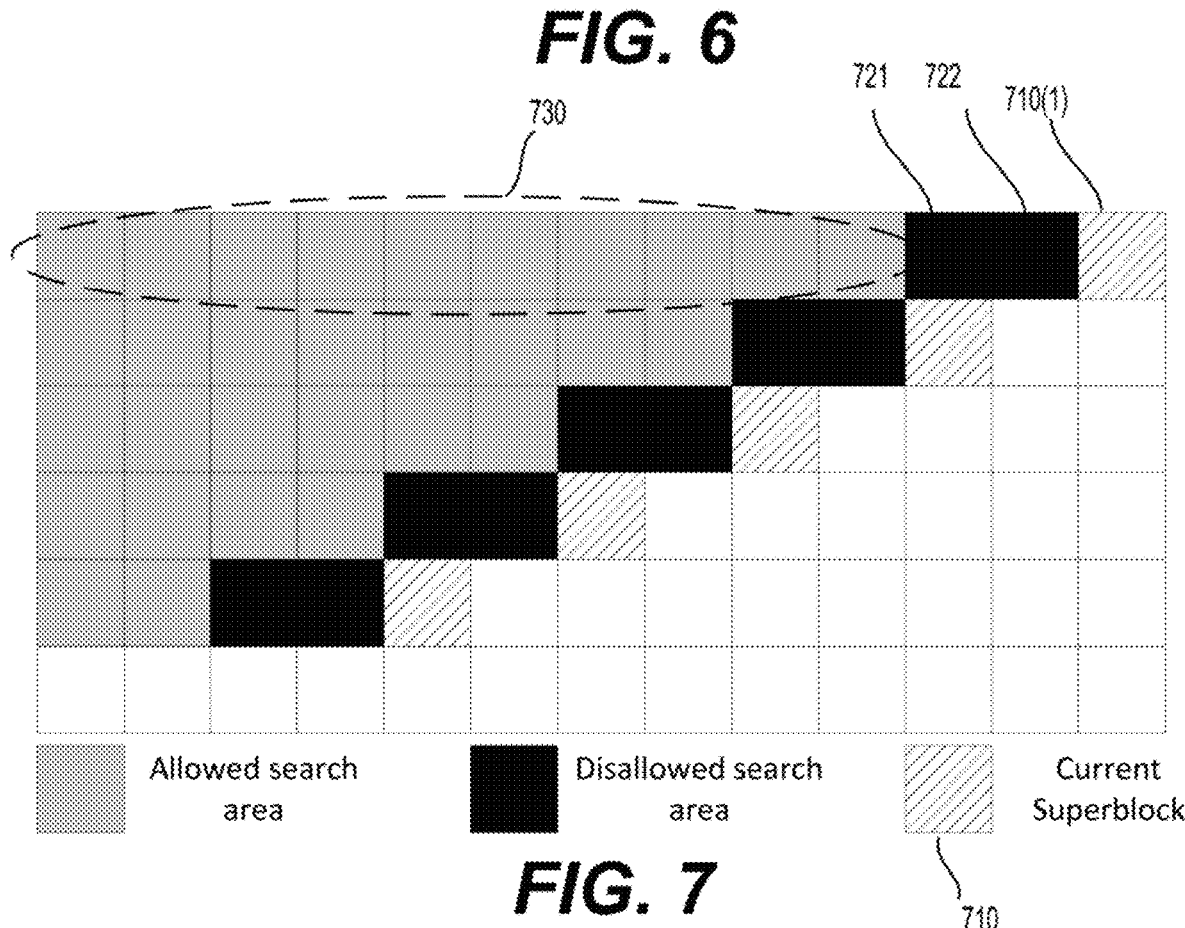
FIG. 7 shows an example of a prediction area for an Intra Block Copy (IntraBC) mode in one superblock prediction according to an embodiment of the disclosure.

FIG. 7 shows an example of the prediction area for the IntraBC mode in one superblock prediction according to an embodiment of the disclosure. Each square can represent a superblock or a CTU. Gray-shaded areas can include an allowed search area, for example, accessible in the IBC mode for respective current superblocks (710) under reconstruction. Black-shaded areas can include disallowed search areas that are not accessible in the IBC mode for the respective current superblocks (710), for example, when D includes two superblocks (or two CTUs). White, non-shaded areas include superblocks to be coded (e.g., reconstructed). In an example, for the current superblock (710(1)), the immediate reconstructed areas include two superblocks (721)-(722) that are to the left of the current superblock (710(1)) (e.g., Dis 2 superblocks). The superblocks (721)-(722) are not accessible for the current superblock (710(1)). An allowed search area (730) is accessible for the current superblock (710(1)).

Figure 8:
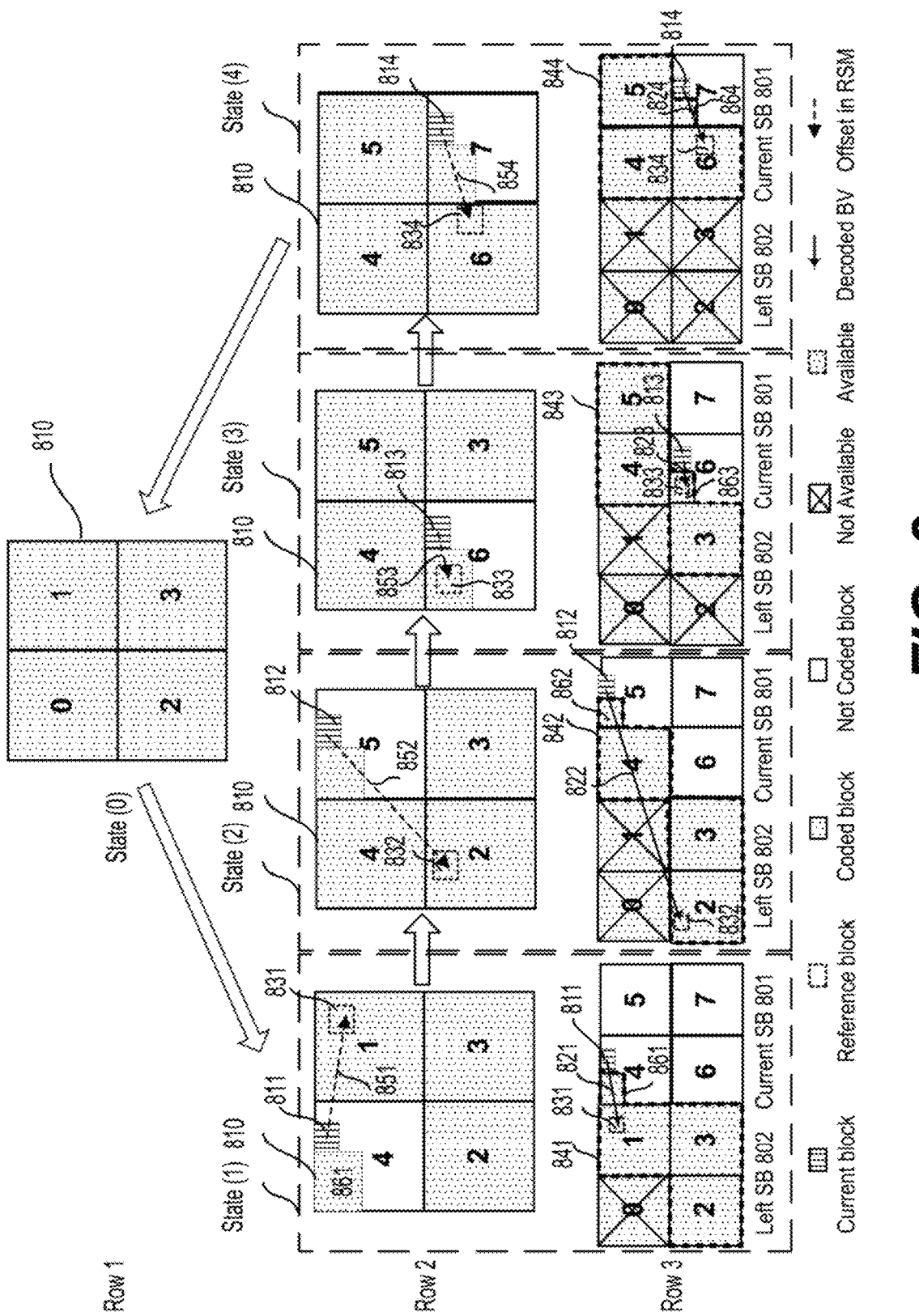
FIG. 8 shows an example of a memory reuse mechanism or a memory update process in an RSM during decoding of a CTU or a SB in a current picture according to an embodiment of the disclosure.
Figures 9A, 9B:
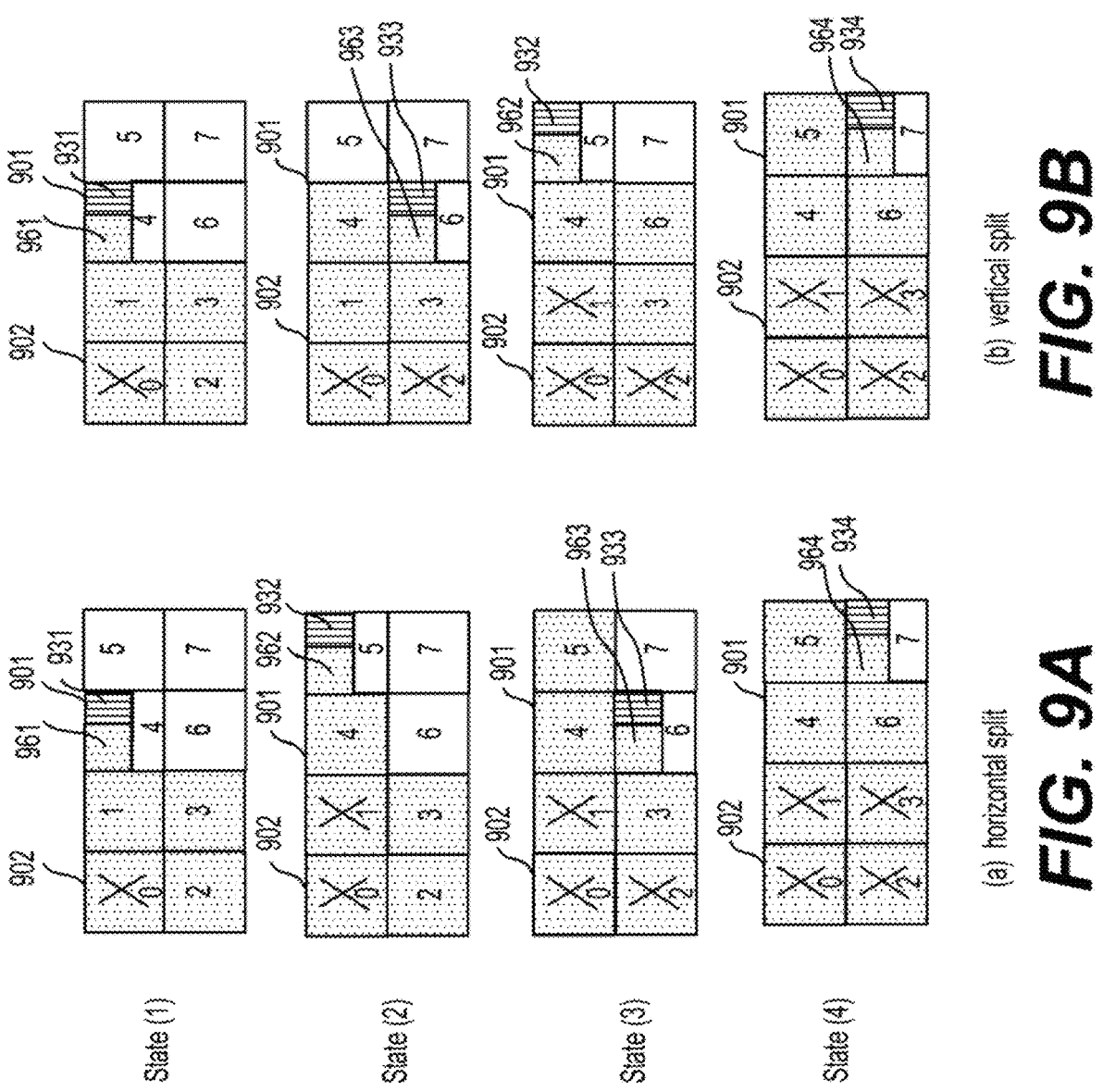
FIGS. 9A-9B show examples of a memory update process in an RSM during decoding of a current SB (or a CTU) with (a) a horizontal split at the SB root (FIG. 9A) or (b) a vertical split at the SB root (FIG. 9B) according to embodiments of the disclosure.

The IntraBC mode with a local reference range such as in AV1 can be described below. The IntraBC mode can be used with the local reference range such as in the AV1 codec. In an embodiment, one superblock (SB) size of "on-chip" memory (referred as RSM) is allocated to store reference samples, with the memory reuse mechanism on a 64×64 basis applied, such as shown in FIGS. 8 and 9A-9B. For example, the following changes (1)-(3) are made on top of the design of the IntraBC mode in AV1. (1) The largest block size in the IntraBC mode can be limited to 64×64. (2) The reference block and the current block are in the same SB row. In an example, the reference block can only be located in the current SB or one SB on the left to the current SB. (3) When any of the 64×64 unit reference sample memory begins to update with the reconstructed samples from the current SB, the previous stored reference samples (e.g., from the left SB) in the whole 64×64 unit are marked as unavailable for generating prediction samples of the IntraBC mode.

FIG. 8 shows an example of a memory reuse mechanism or a memory update process in the RSM during decoding of a CTU or a SB (e.g., a current SB (801)) in a current picture according to an embodiment of the disclosure. Rows 1-2 shows an example from a point of view of the RSM. Row 1 shows the RSM (810) at a state (0). Row 2 shows the RSM (810) at states (1)-(4). Row 3 shows an example from the point of view of a picture such as the current SB (801) that is being coded and a left neighboring SB (802) in the current picture at the states (0)-(4). A quad-tree split can be used at an SB root. An SB can include four regions. In an example, a size of each of the four regions is 64×64. In an example, the current SB (801) includes four regions 4-7, and the left neighboring SB (802) includes four regions 0-3.

Referring to FIG. 8, at the beginning of coding each SB (State (0)), the RSM stores samples of a previous coded SB (e.g., the left neighboring SB (802)). When the current block is located in one of the four regions (e.g., the four 64×64 regions) in the current SB (801) (e.g., shown in one of State(1)-State(4)), the corresponding region in the RSM (810) can be emptied and used to store samples of a current coding region (e.g., a current 64×64 coding region). Thus, the samples in the RSM (810) can be gradually updated by the samples in the current SB (801), such as shown from State (1) to State (4).

Referring to the state (1), the current block (811) is located in the region 4 in the current SB (801), a corresponding region (e.g., a top-left region) in the RSM (810) can be emptied and used to store samples of the region 4 that is the current region being coded. Referring to Row 3, a BV (e.g., an encoded BV or a decoded BV) (821) can point from the current block (811) to a reference block (831) that is within a search range (841) (boundaries of the search range (841) are marked by dashed lines) for the current block (811). Referring to Row 2, a corresponding offset (851) in the RSM (810) can point from the current block (811) to the reference block (831) in the RSM (810). At the state (1), the search range (841) includes the regions 1-3 in the left neighboring SB (802) and coded subregion (861) in the region 4. The search range (841) does not include the region 0 in the left neighboring SB (802).

Referring to the state (2), the current block (812) is located in the region 5 in the current SB (801), a corresponding region (e.g., a top-right region) in the RSM (810) can be emptied and used to store samples of the region 5 that is the current region being coded. A BV (822) can point from the current block (812) to a reference block (832) that is within a search range (842) (boundaries of the search range (842) are marked by dashed lines) for the current block (812). A corresponding offset (852) in the RSM (810) can point from the current block (812) to the reference block (832) in the RSM (810). At the state (2), the search range (842) includes (i) the regions 2-3 in the left neighboring SB (802) and (ii) the region 4 and a coded subregion (862) in the region 5 that are in the current SB (801). The search range (842) does not include the regions 0-1 in the left neighboring SB (802).

Referring to the state (3), the current block (813) is located in the region 6 in the current SB (801), a corresponding region (e.g., a bottom-left region) in the RSM (810) can be emptied and used to store samples of the region 6 that is the current region being coded. A BV (823) can point from the current block (813) to a reference block (833) that is within a search range (843) (boundaries of the search range (843) are marked by dashed lines) for the current block (813). A corresponding offset (853) in the RSM (810) can point from the current block (813) to the reference block (833) in the RSM (810). At the state (3), the search range (843) includes (i) the region 3 in the left neighboring SB (802) and (ii) the regions 4-5 and a coded subregion (863) in the region 6 that are in the current SB (801). The search range (843) does not include the regions 0-2 in the left neighboring SB (802).

Referring to the state (4), the current block (814) is located in the region 7 in the current SB (801), a corresponding region (e.g., a bottom-right region) in the RSM (810) can be emptied and used to store samples of the region 7 that is the current region being coded. A BV (824) can point from the current block (814) to a reference block (834) that is within a search range (844) (boundaries of the search range (844) are marked by dashed lines) for the current block (814). A corresponding offset (854) in the RSM (810) can point from the current block (814) to the reference block (834) in the RSM (810). At the state (4), the search range (844) includes the regions 4-6 and a coded subregion (864) in the region 7 that are in the current SB (801). The search range (844) does not include the regions 0-3 in the left neighboring SB (802).

When the current SB (801) has been coded completely (State (4)), the entire RSM (810) can be filled with the samples (e.g., all the samples) of the current SB (801).

In the example shown in FIG. 8, the current SB (801) is partitioned firstly using the quad-tree split. The coding order of the four 64×64 regions can be the top-left region (e.g., the region 4), the top-right region (e.g., the region 5), the bottom-left region (e.g., the region 6), and the bottom-right region (e.g., the region 7) where the top-left region is coded first and the bottom-right region is coded after coding the top-left region, the top-right region, and the bottom-left region. In other block split decisions such as shown in FIG. 9B, the RSM update process can be similar, e.g., replacing the respective regions in the RSM using the reconstructed samples in the current SB.

FIGS. 9A-9B show examples of the memory update process in the RSM during decoding of a current SB (or a CTU) (901) with (a) a horizontal split at the SB root (FIG. 9A) or (b) a vertical split at the SB root (FIG. 9B) according to embodiments of the disclosure.

In FIGS. 9A-9B, a left neighboring SB (902) is already coded. The current SB (901) is being coded (e.g., encoded or decoded). In an example, a size of each of the current SB (901) and the left neighboring SB (902) is 128×128. Each of the current SB (901) and the left neighboring SB (902) can include four regions (e.g., four blocks) with a size of 64×64. The current SB (901) can include the blocks 4-7, and the left neighboring SB (902) can include the blocks 0-3.

In FIG. 9A, a horizontal split at a SB root is performed and is followed by a vertical split. The current SB (901) can include four blocks: a top-left block (e.g., the block 4), a bottom-left block (e.g., the block 6), a top-right block (e.g., the block 5), and a bottom-right block (e.g., the block 7). A coding order for the current SB (901) can be the top-left block (state 1), the top-right block (state 2), the bottom-left block (state 3), and the bottom-right block (state 4).

In FIG. 9B, a vertical split at a SB root is performed and is followed by a horizontal split. A coding order for the current SB (901) can be the top-left block (state 1), the bottom-left block (state 2), the top-right block (state 3), and the bottom-right block (state 4).

Referring to FIGS. 9A-9B, depending on a location of a current coding block relative to the current SB (901), the following may apply:

1. Referring to the state (1) in FIGS. 9A-9B, if the current block (931) falls into the top-left block (e.g., the block 4) (e.g., a 64×64 block) of the current SB (901), in addition to the already reconstructed samples in a block (961) in the current SB (901), the current block (931) can refer to the reference samples in the bottom-right block 3 (e.g., a 64×64 block), the bottom-left block 2 (e.g., a 64×64 block), and the top-right block 1 (e.g., a 64×64 block) of the left SB (902). A search range of the current block (931) can include the blocks 1-3 and the block (961).

2. Referring to the state (2) in FIG. 9A or the state (3) in FIG. 9B, if the current block (932) falls into the top-right block 5 (e.g., a 64×64 block) of the current SB (901), in addition to the already reconstructed samples in the current SB (901), (a) if a luma sample located at (0, 64) relative to the current SB (901) has not yet been reconstructed, such as shown at the state (2) in FIG. 9A, the current block (932) can refer to the reference samples in the bottom-left block 2 (e.g., a 64×64 block) and the bottom-right block 3 (e.g., a 64×64 block) of the left SB (902) and a search range of the current block (932) can include the blocks 2-4 and the block (962); (b) otherwise, if the luma sample located at the top-left corner (e.g., (0, 64) relative to the current SB (901))

has been reconstructed, such as shown at the state (3) in FIG. 9B, the current block (932) can refer to reference samples in the bottom-right block 3 (e.g., a 64×64 block) of the left SB (902) and a search range of the current block (932) can include the blocks 3, 4, and 6 and the block (962).

3. Referring to the state (3) in FIG. 9A or the state (2) in FIG. 9B, if the current block (933) falls into the bottom-left block of the current SB (901), in addition to the already reconstructed samples in the current SB (901), (a) if a luma location (64, 0) relative to the current SB (901) has not yet been reconstructed, such as shown at the state (2) in FIG. 9B, the current block (933) can refer to the reference samples in the top-right block 1 (e.g., a 64×64 block) and the bottom-right block 3 (e.g., a 64×64 block) of the left SB (902) and a search range of the current block (933) can include the blocks 1, 3, and 4 and the block (963); (b) otherwise, if the luma sample located at the top-left corner of the block 5 (e.g., (64, 0) relative to the current SB (901)) has been reconstructed, such as shown at the state (3) in FIG. 9A, the current block (933) can refer to the reference samples in the bottom-right block 3 (e.g., a 64×64 block) of the left SB (902) and a search range of the current block (933) can include the blocks 3-5 and the block (963).

4. If the current block (934) falls into the bottom-right block 7 of the current SB (901), the current block (934) can only refer to the already reconstructed samples in the current SB (901), such as the already reconstructed samples in the blocks 4-6 and a block (964) and a search range of the current block (934) can include the blocks 4-6 and the block (964).

Figure 10:
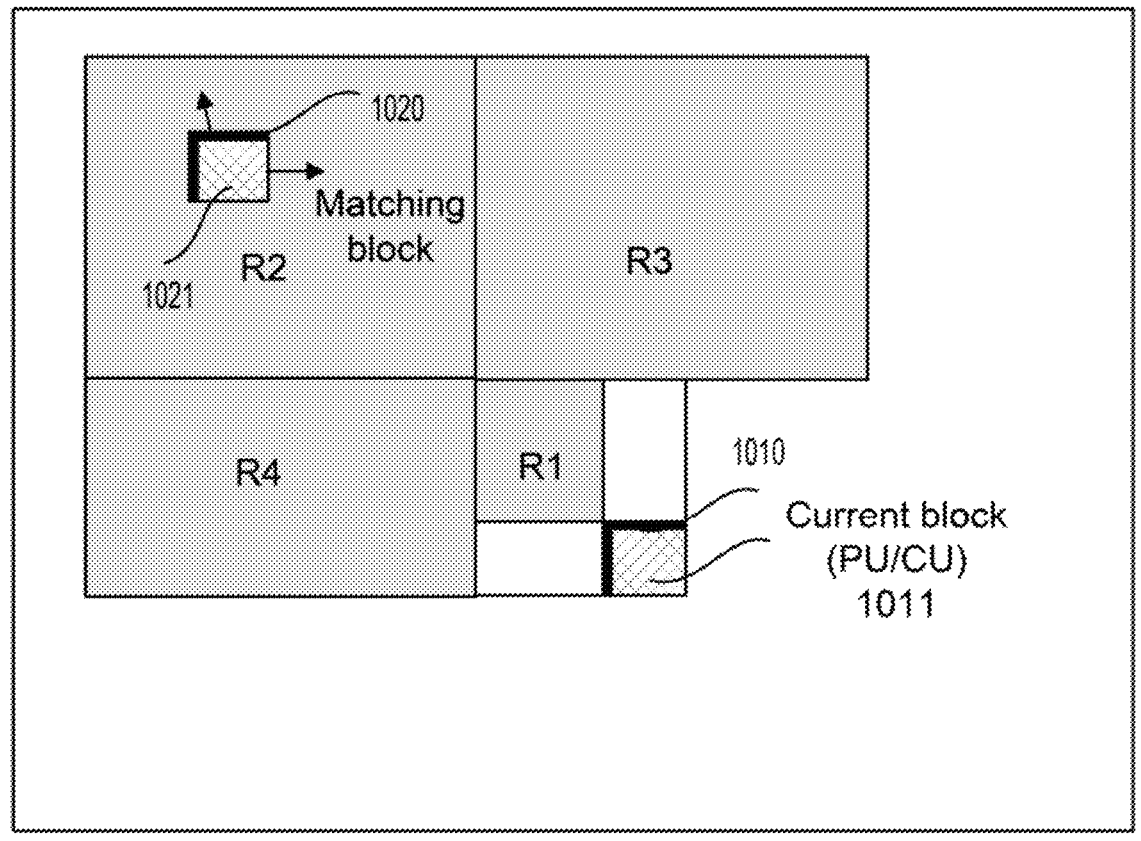
FIG. 10 shows an example of an intra template matching prediction (IntraTMP) mode according to an embodiment of the disclosure.

FIG. 10 shows an example of an intra template matching prediction (IntraTMP) mode according to an embodiment of the disclosure. In an embodiment, such as in ECM software, the IntraTMP is a special intra prediction mode that can copy the best prediction block (1021) from a reconstructed part of a current frame (or a current picture), where a template (e.g., an L-shaped template) (1020) of the best prediction block (1021) can match a current template (1010) of a current block (1011). For a predefined search range, an encoder can search for the most similar template (1020) to the current template (1010) in the reconstructed part of the current frame and can use the corresponding block (1021) as a prediction block. The encoder can signal the usage of the IntraTMP mode, and the same prediction operation can be performed at the decoder side.

The prediction signal can be generated by matching the current template (1010), such as an L-shaped causal neighbor of the current block (1011), with a template (e.g., (1020)) of another block (e.g., (1021)) in a predefined search area. An exemplary search area shown in FIG. 10 can include multiple CTUs (or SBs). Referring to FIG. 10, the search area can include a current CTU R1 (e.g., a portion of the current CTU R1), a top-left CTU R2, an above CTU R3, and a left CTU R4. The cost function can include any suitable cost function, such as a sum of absolute differences (SAD).

Within each region, the decoder can search for a template (e.g., (1020)) that has the least cost (e.g., the least SAD) with respect to the current template (1010) and can use a block (e.g., (1021)) associated with the template having the least SAD as a prediction block.

Dimensions of regions indicated by (SearchRange_w, SearchRange_h) can be set to be proportional to a block dimension (BlkW, BlkH) to have a fixed number of SAD comparisons per pixel. Thus, $$SearchRange\_w = a * BlkW \qquad \text{Eq. (3)}$$

$$SearchRange\_h = a * BlkH \qquad \text{Eq. (4)}$$

The parameter 'a' can be a constant that controls the trade-off between the gain and the complexity. In an example, 'a' is 5.

The Intra template matching tool can be enabled for CUs with certain sizes, such as sizes less than or equal to 64 in width and height. The maximum CU size for the IntraTMP mode can be configurable.

The IntraTMP mode can be signaled, for example, at a CU level through a dedicated flag when decoder-side intra mode derivation (DIMD) is not used for a current CU.

In the context of a dual tree block structure, a chroma IBC mode can be enabled. In an embodiment, such as in VVC, when the coding tree type is a dual-tree type such as chroma separate tree (e.g., DUAL_TREE_CHORMA), the IBC mode is only applied for luma coding blocks, and chroma intra coding blocks may only use other intra prediction modes, and limiting the coding efficiency of intra chroma coding blocks for the chroma separate tree (e.g., DUAL_TREE_CHORMA). In some examples, the chroma IBC mode can be enabled for a chroma separate tree case.

In an embodiment, all reconstructed reference samples inside the same slice or the same tile can be used for the IBC prediction. In various example, a tighter restriction applies such that only a subset of samples in the above described reference area is allowed, such as described in FIGS. 4-8, 9A, and 9B.

For example, when a CTU size is 128×128 in luma samples, in addition to the reconstructed part of the current CTU, multiple left CTUs (e.g., previously coded CTU in the same row as the current CTU) as well as two CTU rows above the current row can be referred to. A search range for the IBC mode can include the reconstructed part of the current CTU, the multiple left CTUs and the two CTU rows above the current row.

In another example, when a CTU size is 256×256 in luma samples, in addition to the reconstructed part of the current CTU, multiple left CTUs (e.g., the previously coded CTU in the same row as the current CTU) as well as one CTU row above the current row can be referred to. A search range for the IBC mode can include the reconstructed part of the current CTU, the multiple left CTUs and the one CTU rows above the current row.

The difference between the above two cases can make sure that the memory used to store reference samples for the IBC prediction is roughly the same.

In some embodiments, when a chroma IBC mode is used for a CST case, for a chroma coding block, corresponding luma samples may not be aligned with the same coding block size and the same location. For example, the corresponding luma samples are collocated with the chroma coding block, and may include luma samples from multiple luma blocks. Thus, the validation of a chroma BV may not be the same as the validation of a luma BV. In some examples, efficient methods to determine if a chroma BV is valid or not for the CST case is desired. The disclosure is related to enabling the IBC mode on chroma components in case of separate intra luma/chroma coding tree structure (e.g., intra dual-tree) is used, such as the validation of a chroma BV for a chroma coding block. For examples, efficient methods are provided in the disclosure to determine if a chroma BV of a chroma block is valid in the chroma separate tree case, and the methods (e.g., described in FIGS. 11-15) can be efficient and improve coding efficiencies in the chroma separate tree case.

In an embodiment, the validation of a BV of a block includes two criteria: a) if a reference block pointed by the BV has been reconstructed; and b) if the reference block can be allowed for the IBC prediction or the IBC mode. When both criteria are met, e.g., the reference block pointed by the BV has been reconstructed and the reference block is allowed for the IBC mode, the BV is a valid BV. Otherwise, the BV is an invalid BV.

The second criteria, e.g., the reference block can be allowed for the IBC mode, can include that the reference block is located within an allowed IBC reference range of the block. The allowed IBC reference range of the block can include any suitable coded area (e.g., reconstructed area) in a current picture that includes the block. Various examples of the allowed IBC reference range of the block are described in the disclosure, such as (i) the gray-shaded area except for the two CTUs (400(1)-400(2)) for the current CU (401) such as used in HEVC as shown in FIG. 4; (ii) the coded samples (e.g., the reconstructed samples) in the dotted area (415) that include the current CTU (400(4)) and the left neighboring CTU (400(3)) such as used in VVC as shown in FIG. 4; (iii) the reference areas such as used in VVC and shown in FIGS. 5-6 where the RSM having the fixed memory size and the RSM update process are used; (iv) the allowed search area such as used in AV1 and shown in FIG. 7; (v) the search range (e.g., one of (841)-(844) in FIG. 8) such as used in AV1 or one of the search ranges described in FIGS. 9A-9B that may be used in AV1; (vi) the predefined search range in the IntraTMP mode such as described in FIG. 10; and (vii) any suitable search range for the IBC mode, the IntraBC mode, or the IntraTMP mode, such as the search range described in the disclosure.

The allowed IBC reference range of the block can also be referred to as the reference range, the reference area, the search range, the search area, and/or the like. In some examples, the allowed IBC reference range of the block is referred to as a local reference range when the allowed IBC reference range is restricted, such as restricted to a current CTU.

In an embodiment, a region (or a coding region) (1102) in a picture or a current picture (1101) that is being coded (e.g., under reconstruction) includes a luma coding region (1120) and a chroma coding region (1110). The chroma coding region (1110) is collocated with the luma coding region (1120), for example, the chroma coding region (1110) and the luma coding region (1120) correspond to the same physical region (1102) in the current picture (1101). Dimensions (e.g., a width and/or a height) of the chroma coding region (1110) and the luma coding region (1120) can be related by the variables SubWidthC and SubHeightC such as specified in Table 1. The variables SubWidthC and SubHeightC can depend on a chroma format sampling structure (or a chroma sampling format) such as 4:2:0, 4:2:2, and the like such as specified in Table 1. In the example shown in FIG. 11, the chroma format sampling structure is 4:2:0, a width and a height of the chroma coding region (1110) are ½ of a width and a height of the luma coding region (1120), respectively.

A coding tree type can be a dual-tree type, such as used in VVC. For the dual-tree type for the region (1102), the luma coding region (1120) and the chroma coding region (1110) can be partitioned using two separate coding tree structures. In an example, the region (1102) is coded using reconstructed samples in the picture (1101) using the IBC mode, the IntraBC mode, the IntraTMP mode, and/or the like. In an example, the picture (1101) is an intra picture (I picture). The luma coding region (1120) and the chroma coding region (1110) can be partitioned using separate intra luma/chroma coding tree structure (e.g., intra dual-tree).

The luma coding region (1120) can be partitioned using any suitable coding tree structure. The chroma coding region (1110) can be partitioned using any suitable coding tree structure. In the example shown in FIG. 11, the chroma coding region (1110) is partitioned into chroma blocks (1111)-(1112), for example, by a binary tree. The chroma block (1111) is to be coded (e.g., encoded or reconstructed) and can be referred to as a current chroma block. In an example, the chroma block (1112) is to be coded after the current chroma block (1111) is coded. In the example shown in FIG. 11, the luma coding region (1120) is partitioned into luma blocks (1121)-(1129), for example, by quad-tree split(s), binary tree, and/or the like. For example, the luma coding region (1120) is partitioned into 4 blocks using a quad-tree split. A top-left block of the luma coding region (1120) is further partitioned into the luma blocks (1121)-(1122) using a binary tree. A top-right block of the luma coding region (1120) is further partitioned into the luma blocks (1127)-(1128) using a binary tree. A bottom-left block of the luma coding region (1120) is further partitioned into the luma blocks (1123)-(1126) using a quad-tree split. A bottom-right block of the luma coding region (1120) is not partitioned and is the luma block (1129).

In an embodiment, the region (1102) can be a current CTU that is being coded (e.g., under reconstruction) in the picture (1101), the luma coding region (1120) is a luma coding tree block (CTB) in the current CTU (1102), and the chroma coding region (1110) is a chroma CTB in the current CTU (1102). The luma CTB and the chroma CTB can be partitioned using separate coding tree structures, such as described above.

In an embodiment, the current CTU that is being coded (e.g., under reconstruction) in the picture (1101) can be partitioned into coding units, such as four coding units using a quad-tree split. The region (1102) can be a coding unit of the four coding units. The luma coding region (1120) and the chroma coding region (1110) in the coding unit (or the region (1102)) can be partitioned using separate coding tree structures, such as described above.

A chroma block vector (BV) (1113) of the current chroma block (1111) in the chroma coding region (1110) can be determined. The current chroma block (1111) can be coded using the IBC mode, the IntraBC mode, or the IntraTMP mode. The chroma BV (1113) can indicate a chroma reference block (1131) in the picture (1101). Whether the chroma BV (1113) is valid can be determined based on collocated luma samples of the current chroma block (1111) and collocated luma samples of the chroma reference block (1131).

Figure 11:
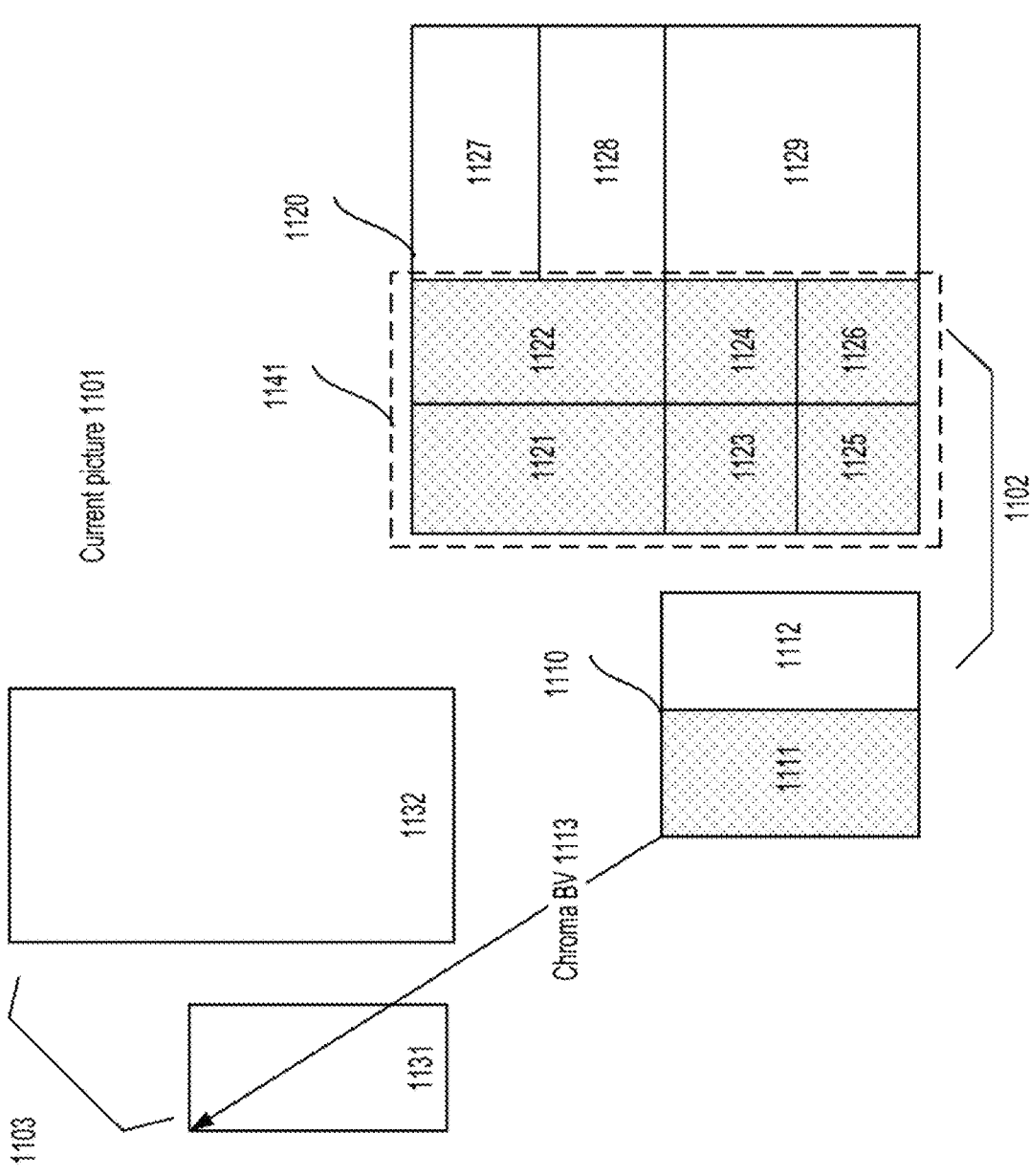
FIG. 11 shows an exemplary allowed reference range of a current chroma block according to some embodiments of the disclosure.

When the dual-tree is used for the region (1102), the current chroma block (1111) can be collocated with one or more luma blocks in the luma coding region (1120). A number of the luma block(s) collocated with the current chroma block (1111) can depend on the coding tree structures used to partition the region (1102). Referring to FIG. 11, the current chroma block (1111) can be collocated with the luma blocks (1121)-(1126). A luma region (1141) in the luma coding region (1120) includes the luma blocks (1121)-(1126) and is collocated with the current chroma block (1111). The collocated luma samples of the current chroma block (1111) can include luma samples in the luma region (1141) (or in the luma blocks (1121)-(1126)).

The chroma reference block (1131) can be collocated with a luma region (1132), for example, the chroma reference block (1131) and the luma region (1132) correspond to a same physical region (1103) in the current picture (1101). The region (1103) can include the chroma reference block (1131) and the luma region (1132). The collocated luma samples of the chroma reference block (1131) can include luma samples in the luma region (1132). The luma region (1132) can include one or more luma blocks, for example, depending on coding tree structure(s) used to partition (i) the luma region (1132) or (ii) a luma CTU that includes the luma region (1132).

In an embodiment, luma samples in the luma coding region (1120) and the luma region (1132) are already coded (e.g., reconstructed) prior to coding the current chroma block (1111).

In response to the determination that the chroma BV (1113) is valid, the current chroma block (1111) can be coded (e.g., encoded or reconstructed) based on the chroma reference block (1131) indicated by the chroma BV (1113). In an example, if the chroma BV (1113) is invalid, the chroma BV (1113) can be corrected to obtain a valid chroma BV (e.g., removing an absolute offset for each direction using a modulo operation with an RSM's width and height that are corrected by scaling factors as described above). The valid chroma BV can be used to reconstruct the current chroma block (1111).

According to an embodiment of the disclosure, the chroma BV is determined to be valid if two criteria are satisfied: (i) the collocated luma samples (e.g., the luma samples in the luma region (1132)) of the chroma reference block (1131) are located within an allowed IBC reference range of the luma region (1141) that includes the collocated luma samples of the current chroma block (1111) and (ii) chroma samples in the chroma reference block (1131) have already been reconstructed. In an example, such as shown in FIG. 11, the first criterion requires that the luma samples in the luma region (1132) are located within the allowed IBC reference range of the luma region (1141) if the luma region (1141) were a luma block to be coded with the IBC mode, the IntraBC mode, the IntraTMP mode, or a similar mode. Examples of the allowed IBC reference range of the luma region (1141) are described in the disclosure, such as in FIGS. 4-8, 9A-9B, and 10.

In an embodiment, the allowed IBC reference range includes reconstructed luma samples in a current CTU and/or one or more previously reconstructed CTUs. The current CTU includes the region (1102).

In an embodiment, if the chroma BV (1113) is not valid, the chroma BV (1113) can be corrected to obtain the valid chroma BV. The current chroma block (1111) can be coded (e.g., encoded or reconstructed) based on another chroma reference block indicated by the valid chroma BV. For example, (i) collocated luma samples of the other chroma reference block are located within the allowed IBC reference range of the luma region (1141) and (ii) chroma samples in the other chroma reference block have already been reconstructed.

In an embodiment, the chroma BV (1113) can be determined by decoding the chroma BV (1113) explicitly from the bitstream (e.g., from the coding information in the bitstream), which is similar to decoding an MV used in the inter prediction. Prediction and coding of the chroma BV (1113) can reuse MV prediction and coding in the inter prediction process.

In an embodiment, the chroma BV (1113) can be determined by deriving the chroma BV (1113), for example, implicitly using the IntraTMP mode, a derived block vector mode, a direct block vector (DBV) mode, or the like.

An example of the direct block vector (DBV) mode is described below. When a chroma dual tree is activated in intra slice, for a chroma CU coded as the direct block vector (DBV) mode, if one of luma blocks in multiple locations (e.g., 5 locations) of a luma component is coded with the IBC mode or the IntraTmp mode, a block vector (e.g., a luma BV bvL) is used to derive a chroma BV (bvC) for the chroma CB. The block vector scaling process can be determined according to template matching.

In an example, the coding information in the bitstream includes a flag (e.g., sps_qtbtt_dual_tree_intra_flag) indicating that the luma coding region (1120) and the chroma coding region (1110) are partitioned using two separate coding tree structures. The flag can be signaled at any suitable level, such as a sequence level in a sequence parameter set (SPS). In an example, the flag sps_qtbtt_dual_tree_intra_flag equal to 1 specifies that, for I slices, each CTU is split into coding units with 64×64 luma samples using an implicit quadtree split, and these coding units are the root of two separate coding_tree syntax structure for a luma component and a chroma component. The flag sps_qtbtt_dual_tree_intra_flag equal to 0 specifies separate coding_tree syntax structure is not used for I slices. When sps_qtbtt_dual_tree_intra_flag is not present, it is inferred to be equal to 0.

According to another embodiment of the disclosure, whether the chroma BV (1113) is valid can be determined based on (i) whether the chroma samples in the chroma reference block (1131) have already been reconstructed and (ii) whether the chroma reference block (1131) is located within an allowed IBC reference range of the current chroma block (1111). In an embodiment, the allowed IBC reference range of the current chroma block (1111) is scaled from an allowed IBC reference range of a corresponding luma region. The corresponding luma region can include the collocated luma samples (e.g., the luma samples in the luma region (1141)) of the current chroma block (1111). In an example, the corresponding luma region is the luma region (1141).

Scaling factors between the allowed IBC reference range of the current chroma block (1111) and the allowed IBC reference range of the luma region (1141) can depend on the chroma format sampling structure.

The scaling factors can include a horizontal scaling factor and a vertical scaling factor. In response to the chroma format sampling structure being 4:2:0, the horizontal scaling factor and the vertical scaling factor are 2 and 2, respectively. For example, a luma width and a luma height are scaled down by 2 when used in the chroma case. In the 4:2:0 format, a dimension (e.g., the horizontal dimension) along the horizontal direction of the allowed IBC reference range of the current chroma block (1111) is ½ of the horizontal dimension of the allowed IBC reference range of the luma region (1141), and a dimension (e.g., the vertical dimension) along the vertical direction of the allowed IBC reference range of the current chroma block (1111) is ½ of the vertical dimension of the allowed IBC reference range of the luma region (1141). A shape of the allowed IBC reference range of the luma region (1141) can be any suitable shape, such as a rectangular shape such as shown in FIG. 4 or an irregular shape such as shown in FIGS. 6, 8, 9A, and 9B.

In response to the chroma format sampling structure being 4:2:2, the horizontal scaling factor and the vertical scaling factor are 2 and 1, respectively. For example, in the 4:2:2 format, a luma width is to be scaled down by 2 and a luma height can remain the same for the chroma case. In response to the chroma format sampling structure being 4:4:4, the horizontal scaling factor and the vertical scaling factor are 1 and 1, respectively.

In an embodiment, to determine if the chroma BV (1113) of the current chroma block (1111) is valid, parameters (such as parameters related to a width and/or a height of a region) that are designed for a luma case can be scaled to a chroma case correspondingly. For chroma channels or components (e.g., U and V channels), scaling factors may be identical or different for different dimensions (e.g., a width and/or a height) such as described above.

Figure 12:
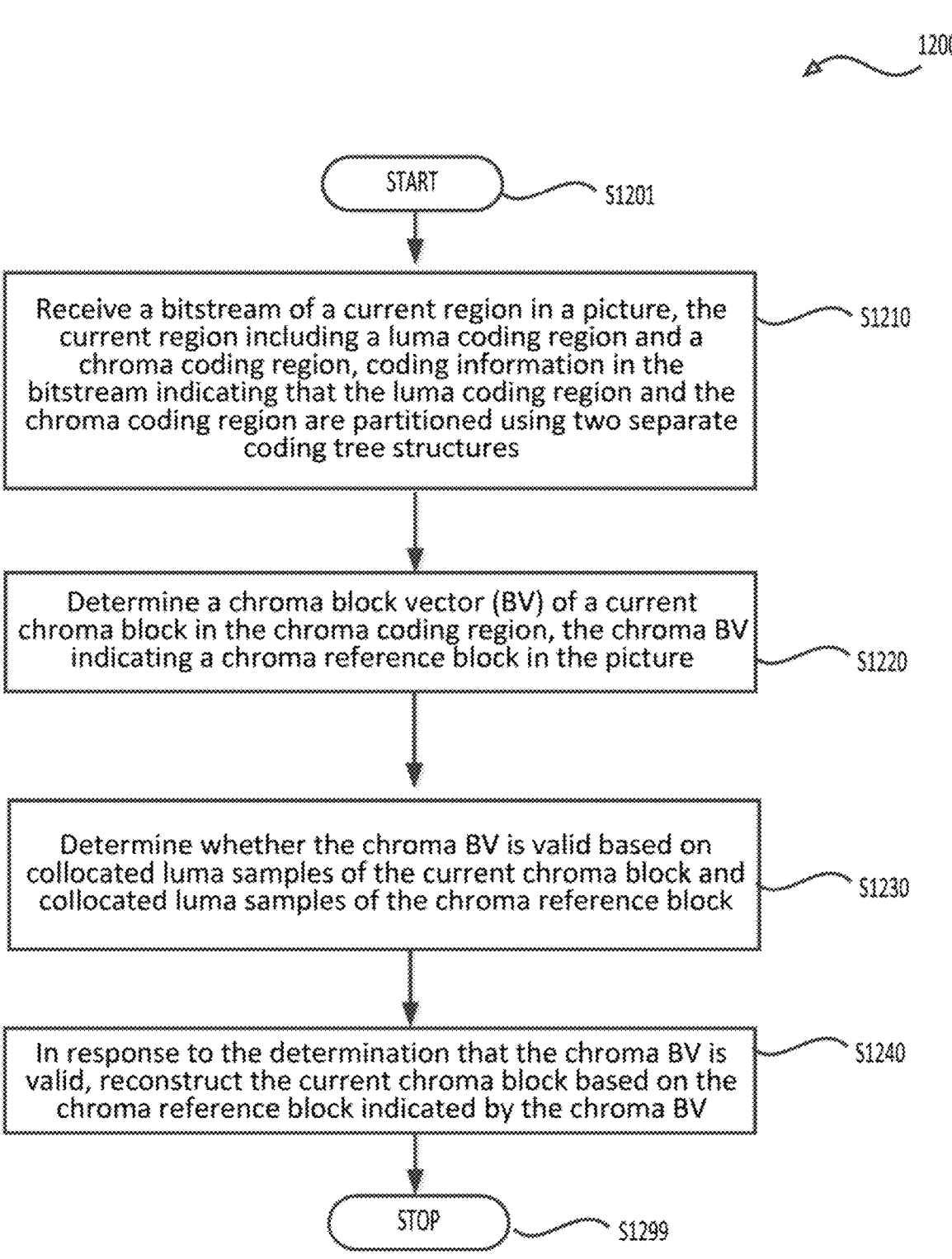
FIG. 12 shows a flow chart outlining a decoding process according to some embodiments of the disclosure.

FIG. 12 shows a flow chart outlining a process (1200) according to an embodiment of the disclosure. The process (1200) can be used in a video decoder. In various embodiments, the process (1200) is executed by processing circuitry, such as the processing circuitry that performs functions of the video decoder (110), the processing circuitry that performs functions of the video decoder (210), and the like. In some embodiments, the process (1200) is implemented in software instructions, thus when the processing circuitry executes the software instructions, the processing circuitry performs the process (1200). The process (1200) starts at (S1201) and proceeds to (S1210).

At (S1210), a bitstream of a current region (e.g., the region (1102)) in a picture (e.g., the picture (1101)) is received. The current region (e.g., (1102)) to be reconstructed including a luma coding region (e.g., (1120)) and a chroma coding region (e.g., (1110)). Coding information in the bitstream can indicate that the luma coding region and the chroma coding region are partitioned using two separate coding tree structures. In an example, the coding information in the bitstream comprises a flag (e.g., sps_qtbtt_dual_tree_intra_flag) indicating that the luma coding region and the chroma coding region are partitioned using two separate coding tree structures.

In an example, the current region is a current CTU to be reconstructed, the luma coding region is a luma coding tree block (CTB) in the current CTU, and the chroma coding region is a chroma CTB in the current CTU.

In another example, a current CTU in the picture is split into four coding units using a quad-tree split, and the current region is a coding unit of the four coding units.

At (S1220), a chroma block vector (BV) (e.g., (1113)) of a current chroma block (e.g., (1111)) that is under reconstruction in the chroma coding region (e.g., (1110)) can be determined, such as described in FIG. 11. The chroma BV can indicate a chroma reference block (e.g., (1131)) in the picture (e.g., (1101)).

In an example, BV coding employs the processes specified for inter prediction, but uses more simplistic rules for candidate list construction. In an example, the IBC BV can be derived from the BV of the luma block.

In an example, the current chroma block is predicted under one of: (i) the IBC mode, (ii) the IntraTMP mode, and (iii) the DBV mode.

The chroma BV can be determined by decoding the chroma BV explicitly, for example, from the coding information. In an example, in response to the current chroma block being predicted under the IBC mode, the chroma BV is decoded explicitly from the coding information. The chroma BV can be determined by deriving the chroma BV implicitly, such as using the IntraTMP mode, the DBV mode, or other mode. In an example, in response to the current chroma block being predicted under the IntraTMP mode or the DBV mode, the chroma BV is derived using the IntraTMP mode or the DBV mode, respectively.

The above methods can be applied to not only explicitly decoded chroma BV validation, but can also be applied to other derived BV modes such as the IntraTMP mode, the DBV mode, or the like.

At (S1230), whether the chroma BV is valid can be determined based on collocated luma samples of the current chroma block and collocated luma samples of the chroma reference block, such as described in FIG. 11.

In an example, to determine if a chroma block vector is valid, collocated luma samples of the current chroma block can be used for the evaluation. In an example, the co-located luma block should be within the allowed IBC reference range or within the current CTU, and the reference chroma block should have been reconstructed. In an example, whether the chroma BV is valid is determined based on whether the collocated luma samples of the chroma reference block are within an allowed range of a luma region that includes the collocated luma samples of the current chroma block. For example, a disclosed method may determine whether the chroma BV is valid based on whether collocated luma samples of the current chroma block and collocated luma samples of the chroma reference block are within an allowed range. In response to the determination that the chroma BV is valid, the disclosed method can reconstruct the current chroma block based on the chroma reference block indicated by the chroma BV.

In an embodiment, the chroma BV is determined to be valid in response to (i) the collocated luma samples of the chroma reference block being located within an allowed intra block copy (IBC) reference range of a luma region that includes the collocated luma samples of the current chroma block and (ii) chroma samples in the chroma reference block having already been reconstructed.

In an example, the allowed IBC reference range includes reconstructed luma samples in a current CTU and/or one or more previously reconstructed CTUs. The current CTU includes the current region.

At (S1240), if the chroma BV is valid, the current chroma block can be reconstructed based on the chroma reference block indicated by the chroma BV.

Then, the process proceeds to (S1299) and terminates.

The process (1200) can be suitably adapted. Step(s) in the process (1200) can be modified and/or omitted. Additional step(s) can be added. Any suitable order of implementation can be used.

In an example, if the chroma BV is not valid, the chroma BV is corrected to obtain a valid chroma BV. The current chroma block can be reconstructed based on another chroma reference block indicated by the valid chroma BV. In an example, (i) collocated luma samples of the other chroma reference block are located within the allowed IBC reference range of the luma region and (ii) chroma samples in the other chroma reference block have already been reconstructed.

FIG. 13 shows a flow chart outlining a process (1300) according to an embodiment of the disclosure. The process (1300) can be used in a video encoder. In various embodiments, the process (1300) is executed by processing circuitry, such as the processing circuitry that performs functions of the video encoder (103), the processing circuitry that performs functions of the video encoder (303), and the like. In some embodiments, the process (1300) is implemented in software instructions, thus when the processing circuitry executes the software instructions, the processing circuitry performs the process (1300). The process starts at (S1301) and proceeds to (S1310).

At (S1310), a chroma BV (e.g., (1113)) of a current chroma block (e.g., (1111)) that is under reconstruction in a chroma coding region (e.g., (1110)) can be determined. The chroma BV can indicate a chroma reference block (e.g., (1131)) in a picture (e.g., (1101)). A luma coding region and the chroma coding region in a current region (e.g., (1102)) of the picture can be partitioned using two separate coding tree structures.

At (S1320), whether the chroma BV is valid can be determined based on collocated luma samples of the current chroma block and collocated luma samples of the chroma reference block, such as described in FIGS. 11-12.

At (S1330), in response to the determination that the chroma BV is valid, the current chroma block can be encoded based on the chroma reference block indicated by the chroma BV.

Then, the process proceeds to (S1399) and terminates.

The process (1300) can be suitably adapted. Step(s) in the process (1300) can be modified and/or omitted. Additional step(s) can be added. Any suitable order of implementation can be used.

In an example, the encoded chroma coding region is included in a bitstream and sent to a decoder. Coding information can be encoded to indicate that the luma coding region and the chroma coding region are partitioned using two separate coding tree structures. In an example, a flag indicating that the luma coding region and the chroma coding region are partitioned using two separate coding tree structures is encoded and included in the bitstream.

Figure 14:
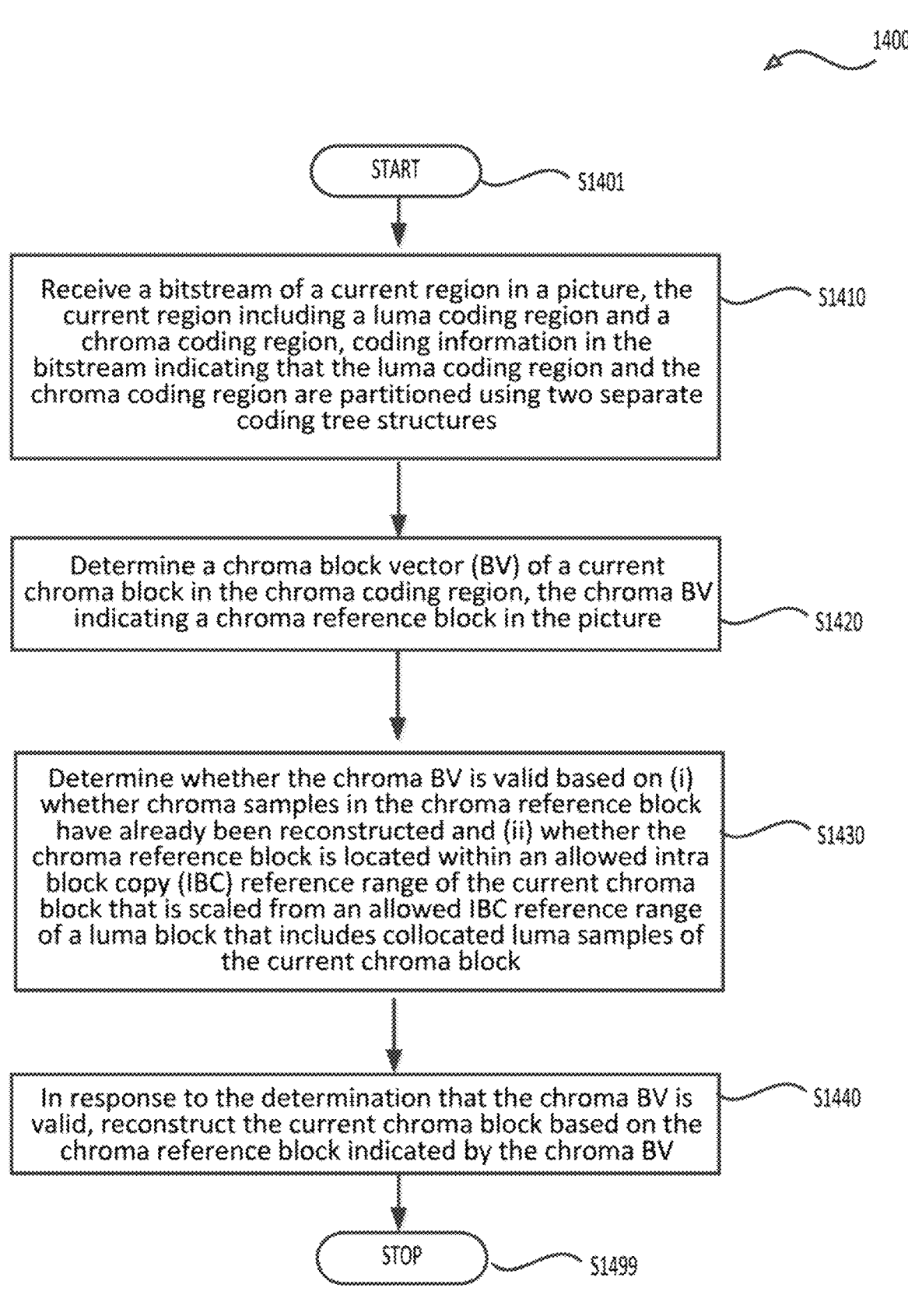
FIG. 14 shows a flow chart outlining a decoding process according to some embodiments of the disclosure.

FIG. 14 shows a flow chart outlining a process (1400) according to an embodiment of the disclosure. The process (1400) can be used in a video decoder. In various embodiments, the process (1400) is executed by processing circuitry, such as the processing circuitry that performs functions of the video decoder (110), the processing circuitry that performs functions of the video decoder (210), and the like. In some embodiments, the process (1400) is implemented in software instructions, thus when the processing circuitry executes the software instructions, the processing circuitry performs the process (1400). The process (1400) starts at (S1401) and proceeds to (S1410).

At (S1410), a bitstream of a current region (e.g., the region (1102)) in a picture (e.g., the picture (1101)) is received. The current region (e.g., (1102)) including a luma coding region (e.g., (1120)) and a chroma coding region (e.g., (1110)). Coding information in the bitstream can indicate that the luma coding region and the chroma coding region are partitioned using two separate coding tree structures. In an example, the coding information in the bitstream comprises a flag indicating that the luma coding region and the chroma coding region are partitioned using two separate coding tree structures.

In an example, the current region is a current coding tree unit (CTU) under reconstruction, the luma coding region is a luma coding tree block (CTB) in the current CTU, and the chroma coding region is a chroma CTB in the current CTU.

In another example, a current CTU in the picture is split into four coding units using a quad-tree split, and the current region is a coding unit of the four coding units.

At (S1420), a chroma block vector (BV) (e.g., (1113)) of a current chroma block (e.g., (1111)) in the chroma coding region (e.g., (1110)) can be determined, such as described in FIGS. 11-12. The chroma BV can indicate a chroma reference block (e.g., (1131)) in the picture (e.g., (1101)).

The chroma BV can be determined by decoding the chroma BV explicitly. The chroma BV can be determined by deriving the chroma BV implicitly, such as using the IntraTMP mode, the DBV mode, or other mode.

At (S1430), whether the chroma BV is valid can be determined based on (i) whether chroma samples in the chroma reference block have already been reconstructed and (ii) whether the chroma reference block is located within an allowed IBC reference range of the current chroma block that is scaled from an allowed IBC reference range of a luma region that includes collocated luma samples of the current chroma block, such as described in FIG. 11.

In an example, whether a chroma block vector is valid can be determined by scaling all the parameters (such as related to a width or a height of a region) that are designed for a luma case to chroma correspondingly. For example, a disclosed method may scale an allowed IBC reference range of a luma region including collocated luma samples of the current chroma block to determine an allowed IBC reference range of the current chroma block. Further, the disclosed method can determine whether the chroma BV is valid based on (i) whether chroma samples in the chroma reference block have already been reconstructed and (ii) whether the chroma reference block is located within the allowed intra block copy (IBC) reference range of the current chroma block. In response to the determination that the chroma BV is valid, the disclosed method can reconstruct the current chroma block based on the chroma reference block indicated by the chroma BV.

In an embodiment, scaling factors between the allowed IBC reference range of the current chroma block and the allowed IBC reference range of the luma region depend on a chroma format sampling structure. The scaling factors can include a horizontal scaling factor and a vertical scaling factor. In response to the chroma format sampling structure being 4:2:0, the horizontal scaling factor and the vertical scaling factor are 2 and 2, respectively. In response to the chroma format sampling structure being 4:2:2, the horizontal scaling factor and the vertical scaling factor are 2 and 1, respectively. In response to the chroma format sampling structure being 4:4:4, the horizontal scaling factor and the vertical scaling factor are 1 and 1, respectively.

In an example, for U and V channels, the scaling factors may not be the same for different dimensions (such as in 4:2:2 format). For example, in the 4:2:0 format, all luma width and luma height are to be scaled down by 2 when used in the chroma case. In another example, in the 4:2:2 format, a luma width is to be scaled down by 2 and a luma height can remain the same for the chroma case.

In an example, the scaling factors between the allowed IBC reference range of the current chroma block and the allowed IBC reference range of the luma region are different for different dimensions.

In an example, the allowed IBC reference range includes reconstructed luma samples in a current CTU and/or one or more previously reconstructed CTUs. The current CTU includes the current region.

At (S1440), in response to the determination that the chroma BV is valid, the current chroma block can be reconstructed based on the chroma reference block indicated by the chroma BV.

Then, the process proceeds to (S1499) and terminates.

The process (1400) can be suitably adapted. Step(s) in the process (1400) can be modified and/or omitted. Additional step(s) can be added. Any suitable order of implementation can be used.

In an example, in response to the determination that the chroma BV is not valid, the chroma BV is corrected to obtain a valid chroma BV. The current chroma block can be reconstructed based on another chroma reference block indicated by the valid chroma BV. In an example, (i) the chroma samples in the chroma reference block have already been reconstructed and (ii) the other chroma reference block is located within the allowed IBC reference range of the current chroma block.

FIG. 15 shows a flow chart outlining a process (1500) according to an embodiment of the disclosure. The process (1500) can be used in a video encoder. In various embodiments, the process (1500) is executed by processing circuitry, such as the processing circuitry that performs functions of the video encoder (103), the processing circuitry that performs functions of the video encoder (303), and the like. In some embodiments, the process (1500) is implemented in software instructions, thus when the processing circuitry executes the software instructions, the processing circuitry performs the process (1500). The process starts at (S1501) and proceeds to (S1510).

At (S1510), a chroma block vector (BV) of a current chroma block in a chroma coding region can be determined. The chroma BV can indicate a chroma reference block in a picture. A luma coding region and the chroma coding region in a current region of the picture can be partitioned using two separate coding tree structures.

At (S1520), whether the chroma BV is valid can be determined based on (i) whether chroma samples in the chroma reference block have already been reconstructed and (ii) whether the chroma reference block is located within an allowed intra block copy (IBC) reference range of the current chroma block that is scaled from an allowed IBC reference range of a luma region that includes collocated luma samples of the current chroma block, such as described in FIGS. 11 and 14.

In an example, to determine if a chroma block vector is valid, parameters (such as related to width or height of a region) that are designed for luma case are scaled to chroma correspondingly. For U and V channels, the scaling factors may not be the same for different dimensions (such as in 4:2:2 format). For example, if in 4:2:0 format, all luma width and luma height need to be scaled down by 2 when used in chroma case. In another example, in 4:2:2 format, luma width needs to be scaled down by 2 and luma height can remain the same for chroma.

In an embodiment, scaling factors between the allowed IBC reference range of the current chroma block and the allowed IBC reference range of the luma region depend on a chroma format sampling structure. The scaling factors can include a horizontal scaling factor and a vertical scaling factor. In response to the chroma format sampling structure being 4:2:0, the horizontal scaling factor and the vertical scaling factor are 2 and 2, respectively. In response to the chroma format sampling structure being 4:2:2, the horizontal scaling factor and the vertical scaling factor are 2 and 1, respectively. In response to the chroma format sampling structure being 4:4:4, the horizontal scaling factor and the vertical scaling factor are 1 and 1, respectively.

At (S1530), in response to the determination that the chroma BV is valid, the current chroma block can be encoded based on the chroma reference block indicated by the chroma BV.

Then, the process proceeds to (S1599) and terminates.

The process (1500) can be suitably adapted. Step(s) in the process (1500) can be modified and/or omitted. Additional step(s) can be added. Any suitable order of implementation can be used.

In an example, the encoded current chroma block is included in a bitstream and sent to a decoder. Coding information can be encoded to indicate that the luma coding region and the chroma coding region are partitioned using two separate coding tree structures. In an example, a flag indicating that the luma coding region and the chroma coding region are partitioned using two separate coding tree structures is encoded and included in the bitstream.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
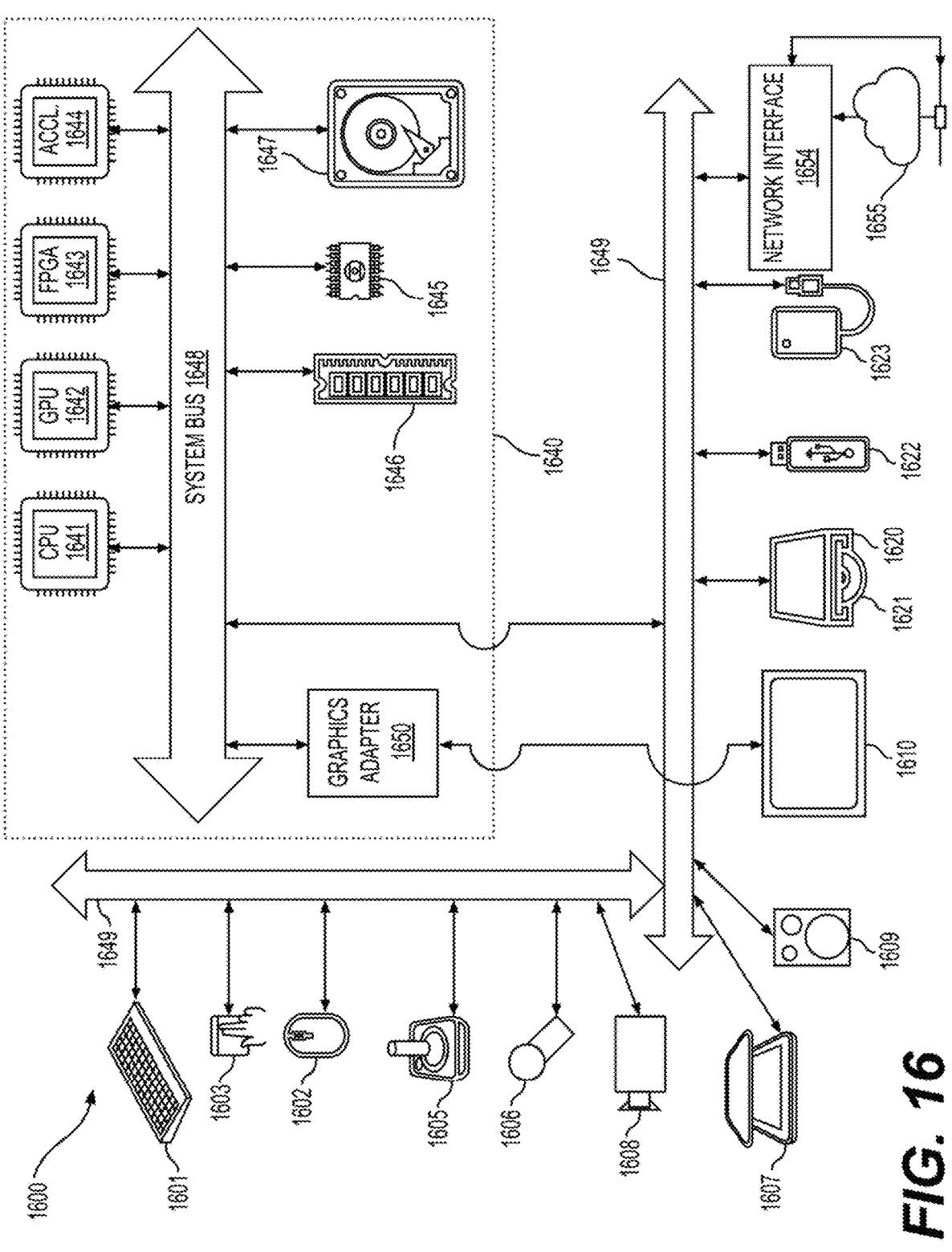
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the screen (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
receiving a bitstream of a current region in a picture, the current region including a luma coding region and a chroma coding region, coding information in the bitstream indicating that the luma coding region and the chroma coding region are partitioned using separate coding tree structures;
determining a chroma block vector (BV) of a current chroma block in the chroma coding region, the chroma BV indicating a chroma reference block in the picture;
determining whether the chroma BV is valid based on whether collocated luma samples of the chroma reference block are within an allowed range of a luma region that includes collocated luma samples of the current chroma block; and
in response to the determination that the chroma BV is valid, reconstructing the current chroma block based on the chroma reference block indicated by the chroma BV.

2. The method of claim 1, wherein the current chroma block is predicted under one of: (i) an intra block copy (IBC) mode, (ii) an intra template matching prediction (IntraTMP) mode, and (iii) a direct block vector (DBV) mode.

3. The method of claim 2, wherein in response to the current chroma block being predicted under the IBC mode, the determining whether the chroma BV is valid comprises:
determining that the chroma BV is valid in response to (i) the collocated luma samples of the chroma reference block being located within an allowed IBC reference range of the luma region that includes the collocated luma samples of the current chroma block and (ii) chroma samples in the chroma reference block having already been reconstructed, the allowed range being the allowed IBC reference range.

4. The method of claim 3, further comprising:
in response to the determination that the chroma BV is not valid,
correcting the chroma BV to obtain a valid chroma BV; and
reconstructing the current chroma block based on another chroma reference block indicated by the valid chroma BV, wherein
(i) collocated luma samples of the other chroma reference block are located within the allowed IBC reference range of the luma region and (ii) chroma samples in the other chroma reference block have already been reconstructed.

5. The method of claim 2, wherein in response to the current chroma block being predicted under the IBC mode, the determining the chroma BV comprises:
decoding the chroma BV explicitly from the coding information.

6. The method of claim 2, wherein in response to the current chroma block being predicted under the IntraTMP mode or the DBV mode, the determining whether the chroma BV is valid comprises:

determining that the chroma BV is valid in response to (i) the collocated luma samples of the chroma reference block being located within the allowed range of the luma region that includes the collocated luma samples of the current chroma block and (ii) chroma samples in the chroma reference block having already been reconstructed.

7. The method of claim 2, wherein in response to the current chroma block being predicted under the IntraTMP mode or the DBV mode, the determining the chroma BV comprises:
deriving the chroma BV using the IntraTMP mode or the DBV mode, respectively.

8. The method of claim 1, wherein
the current region is a current coding tree unit (CTU),
the luma coding region is a luma coding tree block (CTB) in the current CTU, and
the chroma coding region is a chroma CTB in the current CTU.

9. The method of claim 1, wherein
a current coding tree unit (CTU) in the picture is split into four coding units using a quad-tree split, and
the current region is a coding unit of the four coding units.

10. The method of claim 2, wherein the allowed range comprises at least one of reconstructed luma samples in a current coding tree unit (CTU) or one or more previously reconstructed CTUs, the current CTU including the current region.

11. The method of claim 1, wherein the coding information in the bitstream comprises a flag indicating that the luma coding region and the chroma coding region are partitioned using the separate coding tree structures.

12. A method for video decoding in a decoder, comprising:
receiving a bitstream of a current region in a picture, the current region including a luma coding region and a chroma coding region, coding information in the bitstream indicating that the luma coding region and the chroma coding region are partitioned using separate coding tree structures;
determining a chroma block vector (BV) of a current chroma block in the chroma coding region, the chroma BV indicating a chroma reference block in the picture;
scaling an allowed intra block copy (IBC) reference range of a luma region including collocated luma samples of the current chroma block to determine an allowed IBC reference range of the current chroma block;
determining whether the chroma BV is valid based on (i) whether chroma samples in the chroma reference block have already been reconstructed and (ii) whether the chroma reference block is located within the allowed IBC reference range of the current chroma block; and
in response to the determination that the chroma BV is valid, reconstructing the current chroma block based on the chroma reference block indicated by the chroma BV.

13. The method of claim 12, wherein scaling factors between the allowed IBC reference range of the current chroma block and the allowed IBC reference range of the luma region depend on a chroma sampling format.

14. The method of claim 13, wherein
the scaling factors include a horizontal scaling factor and a vertical scaling factor,
in response to the chroma sampling format being 4:2:0, the horizontal scaling factor and the vertical scaling factor are 2 and 2, respectively, in response to the chroma sampling format being 4:2:2, the horizontal scaling factor and the vertical scaling factor are 2 and 1, respectively, and in response to the chroma sampling format being 4:4:4, the horizontal scaling factor and the vertical scaling factor are 1 and 1, respectively.

15. The method of claim 12, wherein scaling factors between the allowed IBC reference range of the current chroma block and the allowed IBC reference range of the luma region are different for different dimensions.

16. The method of claim 12, wherein the determining whether the chroma BV is valid comprises:

determining that the chroma BV is valid in response to (i) the chroma samples in the chroma reference block having already been reconstructed and (ii) the chroma reference block being located within the allowed IBC reference range of the current chroma block.

17. The method of claim 16, further comprising:

in response to the determination that the chroma BV is not valid, correcting the chroma BV to obtain a valid chroma BV; and reconstructing the current chroma block based on another chroma reference block indicated by the valid chroma BV, wherein (i) the chroma samples in the chroma reference block have already been reconstructed and (ii) the other chroma reference block is located within the allowed IBC reference range of the current chroma block.

18. The method of claim 12, wherein the determining the chroma BV comprises:

(i) decoding the chroma BV explicitly from the coding information; or (ii) deriving the chroma BV using an intra template matching prediction (IntraTMP) mode or a direct block vector (DBV) mode.

19. The method of claim 12, wherein the current region is a current coding tree unit (CTU), the luma coding region is a luma coding tree block (CTB) in the current CTU, and the chroma coding region is a chroma CTB in the current CTU.

20. An apparatus for video decoding, comprising processing circuitry configured to:

receive a bitstream of a current region in a picture, the current region including a luma coding region and a chroma coding region, coding information in the bitstream indicating that the luma coding region and the chroma coding region are partitioned using separate coding tree structures;

determine a chroma block vector (BV) of a current chroma block in the chroma coding region, the chroma BV indicating a chroma reference block in the picture;

determine whether the chroma BV is valid based on whether collocated luma samples of the chroma reference block are within an allowed range of a luma region that includes collocated luma samples of the current chroma block; and in response to the determination that the chroma BV is valid, reconstruct the current chroma block based on the chroma reference block indicated by the chroma BV.

* * * * *